US007895162B2

(12) United States Patent  
Tanaka et al.

(10) Patent No.: US 7,895,162 B2
(45) Date of Patent: Feb. 22, 2011

(54) REMOTE COPY SYSTEM, REMOTE ENVIRONMENT SETTING METHOD, AND DATA RESTORE METHOD

(75) Inventors: Koichi Tanaka, Odawara (JP); Koji Nagata, Kaisei (JP); Kosuke Sakai, Isehara (JP)

(73) Assignee: Hitachi, Ltd., Tokyo (JP)

( * ) Notice: Subject to any disclaimer, the term of this patent is extended or adjusted under 35 U.S.C. 154(b) by 422 days.

(21) Appl. No.: 12/038,403

(22) Filed: Feb. 27, 2008

(65) Prior Publication Data

US 2009/0164531 A1 Jun. 25, 2009

(30) Foreign Application Priority Data

Dec. 21, 2007 (JP) .............................. 2007-329561

(51) Int. Cl.
 *G06F 7/00* (2006.01)
 *G06F 17/00* (2006.01)
(52) U.S. Cl. ........................ 707/640; 707/661; 707/674
(58) Field of Classification Search ................. 707/610, 707/640, 679, 999.204, 661, 674
 See application file for complete search history.

(56) References Cited

U.S. PATENT DOCUMENTS

| 6,938,137 | B2 * | 8/2005 | Fujibayashi et al. ......... 711/162 |
| 6,976,039 | B2 * | 12/2005 | Chefalas et al. ....... 707/999.204 |
| 7,143,253 | B2 * | 11/2006 | Kawamura et al. ......... 711/162 |
| 7,721,063 | B2 * | 5/2010 | Ontko ........................ 711/170 |
| 2004/0049553 | A1 * | 3/2004 | Iwamura et al. ............. 709/213 |
| 2005/0188166 | A1 * | 8/2005 | Fujibayashi et al. ......... 711/162 |
| 2005/0193180 | A1 * | 9/2005 | Fujibayashi ................ 711/162 |
| 2005/0204105 | A1 * | 9/2005 | Kawamura et al. .......... 711/162 |
| 2005/0283504 | A1 * | 12/2005 | Suzuki et al. ............... 707/202 |
| 2006/0005048 | A1 * | 1/2006 | Osaki et al. ................ 713/193 |
| 2006/0047776 | A1 * | 3/2006 | Chieng et al. ............... 709/217 |
| 2006/0069889 | A1 * | 3/2006 | Nagaya et al. .............. 711/162 |
| 2006/0112245 | A1 * | 5/2006 | Ikegaya et al. ............. 711/163 |

FOREIGN PATENT DOCUMENTS

JP 2004-102374 4/2004

* cited by examiner

*Primary Examiner*—Jean B. Fleurantin
*Assistant Examiner*—Phong Nguyen
(74) *Attorney, Agent, or Firm*—Brundidge & Stanger, P.C.

(57) ABSTRACT

The input of a prescribed type information element is received from an operator via an operator interface. A first storage system outputs a first type information element required to construct a remote copy environment. A second storage system inputs second setting information, which comprises first type information elements and prescribed type information elements, uses the second setting information to execute a second setting, and outputs the second type information element required to construct a remote copy environment. The first storage system inputs first setting information, which comprises the second type information element, and uses the first setting information to execute a first setting. Since the types of information elements required to construct a remote copy environment are exchanged between the storage systems, the number of types of information elements inputted by the operator are less than the number of types of information elements required to construct the remote copy environment.

7 Claims, 15 Drawing Sheets

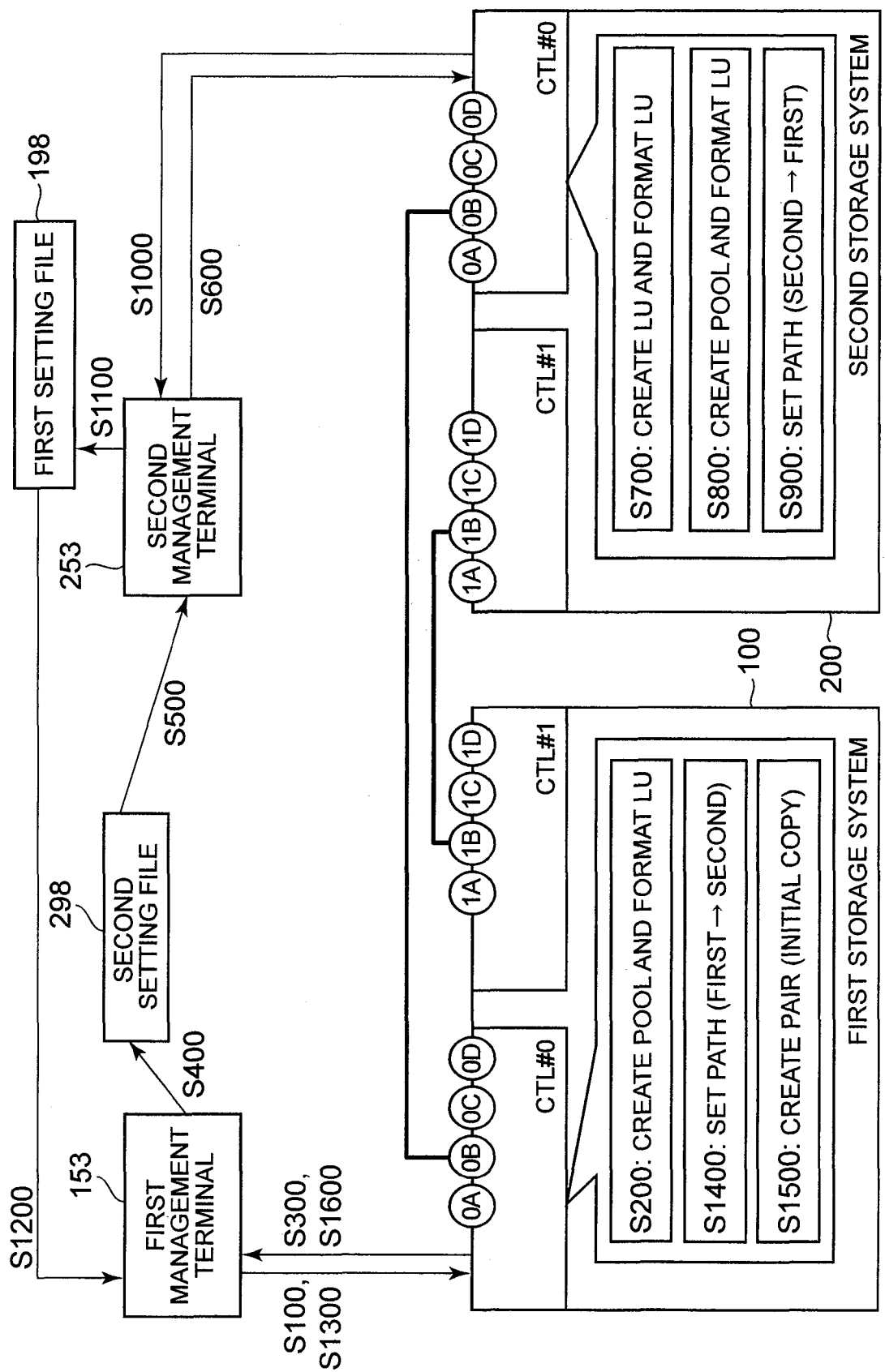

| SOURCE | | ITEM |
|---|---|---|
| OPERATOR | | SECOND STORAGE SYSTEM ID |
| | | PRIMARY LU LIST |
| FIRST STORAGE SYSTEM | | ENCRYPTED SECOND/ FIRST PATH CHAP SECRET |
| | | LU CONFIGURATION INFORMATION |
| | | TARGET LIST |
| | | POOL CONFIGURATION INFORMATION |
| | | FIRST STORAGE SYSTEM ID |
| | | IP ADDRESS OF FIRST STORAGE SYSTEM iSCSI PORT |

| SOURCE | ITEM |
|---|---|
| SECOND STORAGE SYSTEM | IP ADDRESS OF SECOND STORAGE SYSTEM iSCSI PORT |
| | ENCRYPTED FIRST/SECOND PATH CHAP SECRET |
| | LU PAIR INFORMATION |
| SECOND SETTING FILE | SECOND STORAGE SYSTEM ID |

US 7,895,162 B2

REMOTE COPY SYSTEM, REMOTE ENVIRONMENT SETTING METHOD, AND DATA RESTORE METHOD

CROSS-REFERENCE TO PRIOR APPLICATION

This application relates to and claims the benefit of priority from Japanese Patent Application number 2007-329561, filed on Dec. 21, 2007, the entire disclosure of which is incorporated herein by reference.

BACKGROUND

The present invention generally relates to the copying of data between storage systems.

A copy (remote copy) carried out between storage systems, for example, can be one of two types: replication or migration. For example, the technique disclosed in Japanese Patent Laid-open No. 2004-102374 (hereinafter, referred to as Patent Document 1) is known as a data migration method. According to Patent Document 1, a host reads data from a migration-source storage system, and sends the read data to a migration-target storage system.

For example, in order to enable the copying of data from a first storage system to a second storage system, the information elements required to construct remote copy environments in both the first storage system and the second storage system must be set. Generally speaking, the setting of information elements of this type is carried out by a person, and is known to comprise a large number of steps. For this reason, it is impossible for a person with low-level skills to construct a remote copy environment.

Further, for example, there may be cases in which data stored in a plurality of first logical volumes inside the first storage system is backed up in a plurality of second logical volumes inside the second storage system, and when a failure occurs in the first storage system, the data stored in the plurality of second logical volumes in the second storage system must be restored to a third storage system. In this case, a plurality of logical volumes, which will become the respective storage destinations of the data stored in the plurality of second logical volumes, must be constructed in the third storage system. This construction is troublesome for a user to perform.

SUMMARY

Therefore, a first object of the present invention is to lessen the workload placed on the user when constructing a remote copy environment.

A second object of the present invention is lessen the workload placed on the user when restoring replicated data to the third storage system from the plurality of second logical volumes inside the second storage system, in which replications of the data stored in the plurality of first logical volumes inside the first storage system are respectively stored.

Other objects of the present invention should become clear from the following explanation.

In a first aspect, the input of a prescribed type of information element is received from an operator by way of an operator interface. A first storage system outputs a first type of information element required to construct a remote copy environment. A second storage system is inputted with second setting information, which comprises the first type information element and a prescribed type of information element, and uses the second setting information to execute a second setting, and at the same time outputs a second type of information element required to construct a remote copy environment. The first storage system is inputted with first setting information, which comprises the second type of information element, and uses the first setting information to execute a first setting. Since the types of information elements required to construct a remote copy environment are exchanged between the storage systems, the number of types of operator-inputted information elements is less than the number of types of information elements required to construct the remote copy environment.

In a second aspect, configuration information stored in one or more first physical storage devices inside the first storage system is saved to the second storage system, which has a plurality of second logical volumes storing replications of the data stored in the plurality of first logical volumes. When a restore indication is received from the operator by way of the operator interface, the plurality of first logical volumes is restored to a third storage system instead of the first storage system in which a failure has occurred based on the saved configuration information. Data stored in the plurality of second logical volumes are respectively restored in the restored plurality of first logical volumes is accordance with a remote copy between the second and third storage systems.

BRIEF DESCRIPTION OF THE DRAWINGS

FIG. 5 shows an overview of the flow of processing carried out by the first embodiment;

FIG. 6A shows the configuration of a second setting file;

FIG. 6B shows the configuration of a first setting file;

DESCRIPTION OF THE PREFERRED EMBODIMENTS

Figure 1:
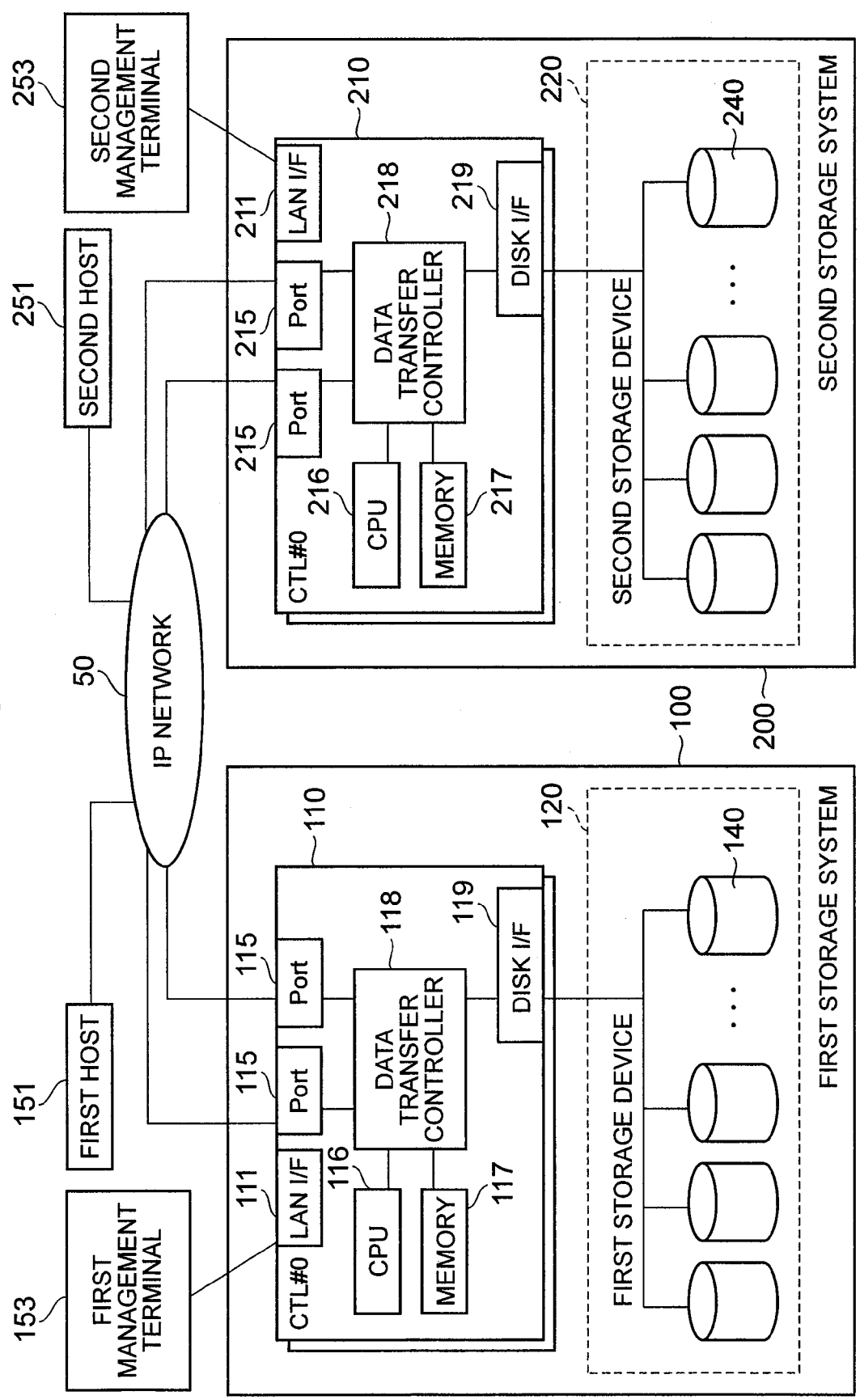
FIG. 1 shows an example of the configuration of a remote copy system related to a first embodiment of the present invention.

In Embodiment 1, a remote copy system comprises a first storage system; a second storage system, which is connected to the first storage system; and a first operator interface for receiving the input of a prescribed type information element from an operator. The first storage system comprises a plurality of first logical volumes; a plurality of first communication ports; and a first controller. The second storage system comprises a plurality of second communication ports; and a second controller. The first controller comprises a first acquisition unit; a first output unit; a first input unit; and a first setting unit. The first acquisition unit acquires a plurality of first type information elements, which constitute a plurality of elements of second setting information. The first output unit outputs the acquired plurality of first type information elements. The first input unit inputs first setting information, comprising a plurality of second type information elements. The first setting unit executes a first setting required to construct a remote copy environment, based on the plurality of second type information elements, which are comprised in the first setting information, and the plurality of first type information elements. The remote copy environment is an environment, which enables to copy data between a certain first logical volume of the plurality of first logical volumes and a certain second logical volume by way of a certain first communication port of the plurality of first communication ports, and a certain second communication port of the plurality of second communication ports. The second setting information is information, which is inputted to the second storage system, and is used in the second setting required for constructing the remote copy environment. The first setting information is information, which is inputted to the first storage system, and is used in the first setting. The second controller comprises a second input unit; a second setting unit; a second acquisition unit; and a second output unit. The second input unit inputs the second setting information, which comprises the plurality of first type information elements, and a prescribed type of information element inputted to the first operator interface. The second setting unit executes the second setting based on the plurality of first type information elements and the prescribed type information element. The second acquisition unit acquires the plurality of second type information elements, which constitute the plurality of information elements of the first setting information. The second output unit outputs the acquired plurality of second type information elements. The number of the prescribed types of information elements is a smaller number than the types of information elements required for constructing the remote copy environment.

In Embodiment 2 according to Embodiment 1, the prescribed type information element is volume identification information for the certain first logical volume. The first acquisition unit acquires the storage capacity of the certain first logical volume as the first type information element. The second acquisition unit acquires, as the second type information elements, volume identification information of a second logical volume, which is the certain second logical volume for configuring a volume pair with the certain first logical volume, and which has storage capacity that is equal to or greater than the storage capacity of the certain first logical volume. In the first setting, volume pair information comprising the volume identification information of the certain first logical volume and the volume identification information of the certain second logical volume is set.

In Embodiment 3 according to Embodiment 2, one second storage system is connected to a plurality of first storage systems. The volume identification information is the volume number. The second acquisition unit, as a rule, acquires, as the volume number of the certain second logical volume, the same volume number as the volume number of the certain first logical volume, and as an exception to that rule, acquires a volume number that differs from the volume number of the certain first logical volume when the same volume number as the volume number of the certain first logical volume has already been set.

In Embodiment 4 according to any of Embodiments 1 through 3, the second acquisition unit acquires address information of the certain second communication port as the second type information element. In the first setting, a first path information is set based on port identification information for the certain first communication port, and the address information of the certain second communication port. The first path information denotes a first path via which data is outputted from the certain first communication port and inputted to the certain second communication port. The certain first communication port and the certain second communication port are predetermined communication ports.

In Embodiment 5 according to any of Embodiments 1 through 4, the first acquisition unit acquires address information of the certain first communication port as the first type information element. In the second setting, a second path information is set based on the address information of the certain first communication port, and the port identification information of the certain second communication port. The second path information denotes a second path via which data is outputted from the certain second communication port, and inputted to the certain first communication port. The certain first communication port and the certain second communication port are predetermined communication ports.

In Embodiment 6 according to Embodiment 5, the present invention further comprises a backup unit that backs up data stored in the certain first logical volume in the certain second logical volume by way of the first path; and a data restore unit that restores data stored in the certain second logical volume in either the certain first logical volume or a restored first logical volume by way of either the second path or a newly created second path.

In Embodiment 7 according to Embodiment 6, the present invention further comprises a second operator interface for receiving a restore indication from the operator; a first configuration information read unit; a configuration information save unit; a second configuration information read unit; and a volume restore unit. The first configuration information read unit reads configuration information from at least one of the plurality of first physical storage devices. The configuration information save unit saves the read configuration information to the second storage system. The second configuration information read unit reads the saved configuration information upon receiving a restore indication via the second operator interface. The volume restore unit writes the read configuration information to at least one of the plurality of first physical storage devices, and on the basis of the configuration information, the restores the plurality of first logical volumes in a third storage system instead of the first storage system in which a failure has occurred. The configuration information is information related to how the first logical volume is configured in use of which first physical storage device in the first storage system, at what amount of storage capacity, and in correspondence to what volume identification information. The data restore unit restores the data stored in the plurality of second logical volumes in the constructed plurality of first logical volumes by way of the second path.

In Embodiment 8 according to Embodiment 7, one second storage system is connected to a plurality of first storage systems. The configuration information save unit saves the configuration information to the second storage system for each first storage system.

In Embodiment 9 according to any of Embodiments 1 through 8, the present invention further comprises an advisability determination unit. The advisability determination unit uses information, which is stored by the second storage system, and which is related to the second storage system, and the second setting information, to carry out an advisability determination as to whether or not the second storage system can be the partner of the first storage system. The second setting unit executes the second setting when the result of the advisability determination is affirmative.

In Embodiment 10 according to Embodiment 9, the prescribed type information element is system identification information of a storage system, which is to be the partner of the first storage system. Information related to the second storage system is system identification information of the second storage system. The advisability determination comprises a determination as to whether or not the system identification information serving as the prescribed type information element, which is comprised in the second setting information, conforms to the system identification information that the second storage system stores.

In Embodiment 11 according to Embodiment 1, the respective first communication ports and the respective second communication ports are iSCSI ports. The prescribed type information element is volume identification information for the certain first logical volume, and system identification information for the partner storage device of the first storage system. The remote copy system further comprises an advisability determination unit that executes an advisability determination as to whether or not the second storage system can be the partner of the first storage system. The first acquisition unit acquires, as the first type information element, the port IP address of the certain first communication port; the storage capacity of the certain first logical volume; and the system identification information of the first storage system. The second acquisition unit acquires, as the second type information element, the volume identification information of a second logical volume, which is the certain second logical volume for configuring a volume pair with the certain first logical volume, and which has storage capacity equal to or more than that of the certain first logical volume; and the port IP address of the certain second communication port. The advisability determination unit comprises a determination as to whether or not the system identification information serving as the prescribed type information element comprised in the second setting information conforms to the system identification information stored by the second storage system, and a determination as to whether or not the second storage system has greater storage capacity than the storage capacity of the certain first logical volume. The second setting unit executes the second setting when the result of the advisability determination is affirmative. In the second setting, second path information is set on the basis of the port IP address of the certain first communication port; the port identification information of the certain second communication port; and a timeout time and/or line bandwidth information. The second path information denotes a second path via which data is outputted from the certain second communication port and inputted to the certain first communication port. In the first setting, volume pair information comprising the volume identification information of the certain first logical volume and the volume identification information of the certain second logical volume, is set, and, in addition, first path information is set on the basis of the port identification information of the certain first communication port; the port IP address of the certain second communication port; and a timeout time and/or line bandwidth information. The first path information denotes a first path via which data is outputted from the certain first communication port, and inputted to the certain second communication port. The certain first logical volume is the data copy-source logical volume. The certain second logical volume is the data copy-target logical volume. The certain first communication port and the certain second communication port are predetermined communication ports. The timeout time and/or line bandwidth information are fixed values.

In Embodiment 12 according to any of Embodiments 1 through 11, the first operator interface is displayed on a computer. The first output unit of the first controller sends the second setting information from the first controller to the second controller without going through the computer, and the second input unit of the second controller inputs the second setting information. The second output unit of the second controller sends the first setting information from the second controller to the first controller without going through the computer, and the first input unit of the first controller inputs the first setting information.

In Embodiment 13 according to any of Embodiments 1 through 12, the prescribed type information element is merely the identification information of the certain first logical volume, and/or the system identification information of the storage system constituting the partner of the first storage system.

In Embodiment 14, a remote copy system for carrying out a data remote copy between storage systems comprises a first storage system; a second storage system, which is connected to the first storage system; and an operator interface for receiving a restore indication from the operator. The first storage system comprises a plurality of first physical storage devices; plurality of first logical volumes created on the basis of the plurality of first physical storage devices; and a first controller. The second storage system comprises a plurality of second physical storage devices; plurality of second logical volumes created on the basis of the plurality of second physical storage devices; and a second controller. At least one of the plurality of first physical storage devices stores configuration information related to how the first logical volume is configured in use of which first physical storage device in the first storage system, at what amount of storage capacity, and in correspondence to what volume identification information. The remote copy system comprises a backup unit that backs up data stored in respective first logical volumes in respective second logical volume; a first configuration information read unit that reads the configuration information from at least one of the plurality of first physical storage devices; a configuration information save unit that saves the read configuration information to the second storage system; a second configuration information read unit that reads the saved configuration information upon receiving a restore indication via the operator interface; a volume restore unit that writes the read configuration information to at least one of the plurality of first physical storage devices inside a third storage system instead of the first storage system in which a failure has occurred, and for restoring, on the basis of the configuration information, the plurality of first logical volumes in the third storage system; and a data restore unit that restores data stored in the respective second logical volumes in either the constructed respective first logical volumes.

In Embodiment 15 according to Embodiment 14, when a configuration information element, which matches a certain configuration information element inside configuration information received from the second storage system, is stored in at least one of the plurality of first physical storage devices, the configuration information restore unit changes the certain configuration information element inside the configuration information received from the second storage system to a content, which does not duplicate the existing configuration information element. The information, which is sent pursuant to the restore request, is the post-change configuration information element.

At least one of the first acquisition unit, the first output unit, the first input unit, the first setting unit, the second input unit, the second setting unit, the second acquisition unit, the first output unit, the backup unit, the data restore unit, the first configuration information read unit, the configuration information save unit, the second configuration information read unit, the volume restore unit, and the advisability determination unit can be called means, and can be constructed from hardware, a computer program, or a combination thereof (for example, one part can be realized via a computer program, and the remainder can be realized via hardware). The computer program is executed by being read into a prescribed processor. Further, a storage region, which resides in a memory or other such hardware resource, can be used as needed when carrying out information processing by reading the computer program in to the processor. Further, the computer program can be installed in the computer from a CD-ROM or other such recording media, or can be downloaded to the computer via a communication network.

A number of embodiments of the present invention will be explained in detail hereinbelow while referring to the figures. Furthermore, the present invention is not limited to these embodiments.

First Embodiment

FIG. 1 shows an example of the configuration of a remote copy system related to a first embodiment of the present invention. Furthermore, in FIG. 1, elements related to the first storage system are assigned reference numerals in the 100's, and elements related to the second storage system are assigned reference numerals in the 200's. If an element related to the first storage system and an element related to the second storage system are the same type element, only the values of the hundred's digits of the reference numerals assigned to the same type elements will differ; the values of the other digits of these reference numerals will be the same. Thus, when explaining elements of the same type, these elements will be explained without distinguishing between them as to "first" or "second". For example, when providing an explanation that encompasses both the first storage system 100 and the second storage system 200, the explanation will use the descriptive phrase "storage system 100 (200)".

The first storage system 100, second storage system 200, one or more first hosts 151, and one or more second hosts 251 are connected to an IP (Internet Protocol) network (for example, the Internet) 50.

The first host 151 is a computer for sending an access command (a write command or read command), which specifies a first logical volume.

The storage system 100 (200) can be broadly divided into a controller 110 (210) and a storage device 120 (220). The controller 110 (210) comprises a LAN interface device (LAN I/F) 111 (211); iSCSI port 115 (215); CPU (Central Processing Unit) 116 (216); memory 117 (217); disk I/F 119 (219); and data transfer controller 118 (218). The storage device 120 (220) is configured from a plurality of storage media drives 140 (240). A variety of drives can be used as the storage media drive 140 (240), such as a hard disk drive (HDD), DVD drive, and flash memory drive, but in the first embodiment, it is an HDD.

The LAN I/F 111 (211) is an I/F, which is connected to a LAN that is not shown in the figure. A management terminal 153 (253) is connected to the LAN. Thus, the controller 110 (210) receives information from the management terminal 153 (253) via the LAN I/F 111 (211).

The iSCSI port 115 (215) is a communication port connected to the IP network 50. An iSCSI name is allocated to each iSCSI port 115 (215).

The data transfer controller 118 (218) controls the transfer of data among the LAN I/F 111 (211), iSCSI port 115 (215), CPU 116 (216), memory 117 (217) and disk I/F 119 (219).

The disk I/F 119 (219) carries out the writing and reading of data to and from the HDD 140 (240).

Figure 2:
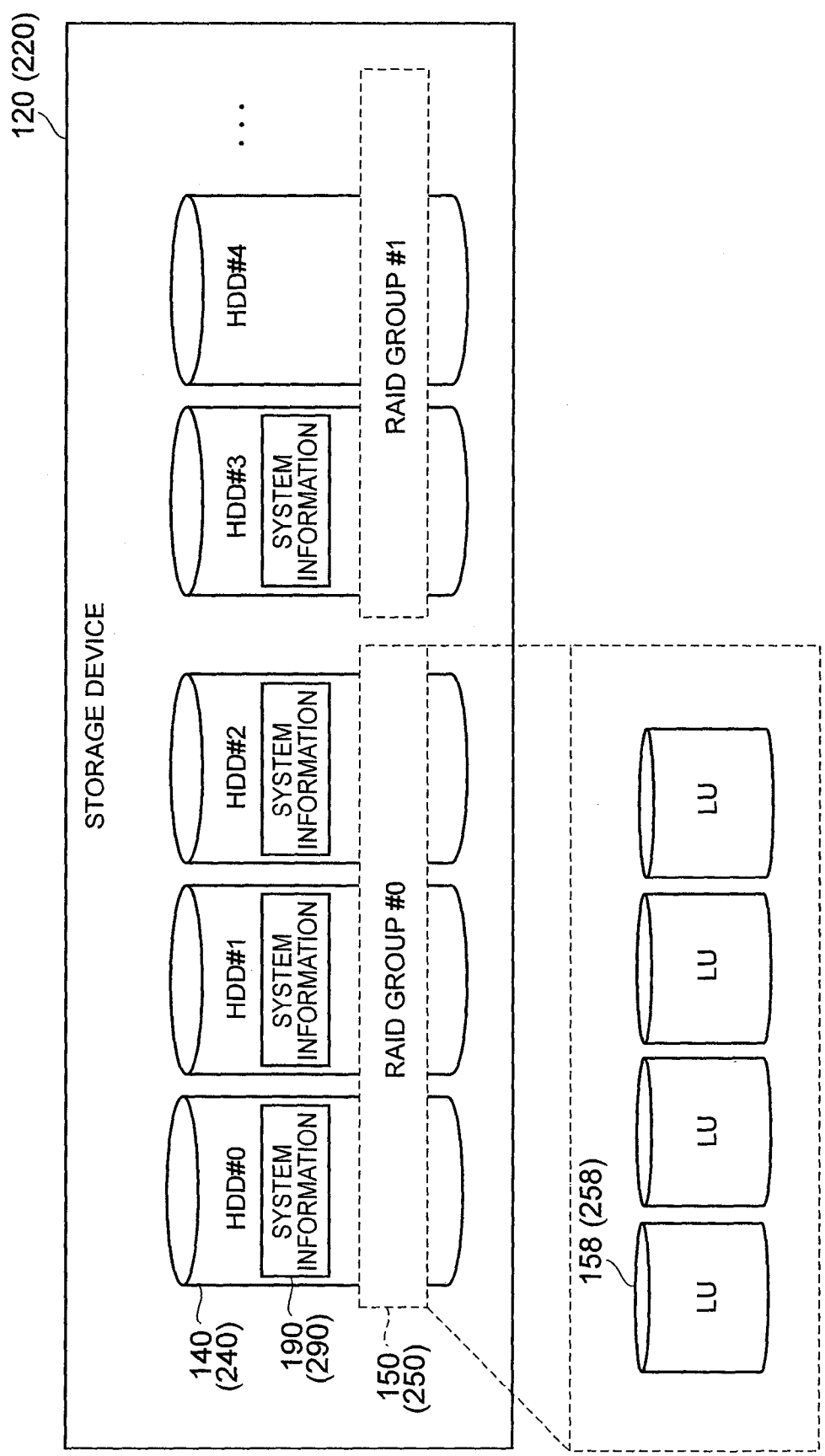
FIG. 2 is a block diagram of a storage device 120 (220)

FIG. 2 is a block diagram of the storage device 120 (220).

The storage device 120 (220) is configured from a plurality of HDD 140. System information 190 (290) is stored in a portion of the areas of a number of HDD 140. System information 190 (290) as used here refers to information related to either the configuration or control of the storage system 100 (200). For example, system information 190 (290) comprises information related to at least one type of element from among a physical or logical configuration of the storage system 100 (200), a unique setting value allocated to the storage system 100 (200), and a unique function executable by the storage system 100 (200). The system information 190 (290) is stored in a storage area other than the storage area (user area) provided in the host 151 (251). Conversely, user data, which is the data accessed by the host 151 (251), is stored in the user area.

Further, a RAID group (may also be abbreviated as "RG") 150 (250) is configured using the plurality of HDD 140. A logical volume (hereinafter referred to as "LU" (Logical Unit)) 158 (258), which is provided to the host 151 (251), is created by allocating a prescribed storage area comprised in the RAID groups 150 (250).

Figure 3:
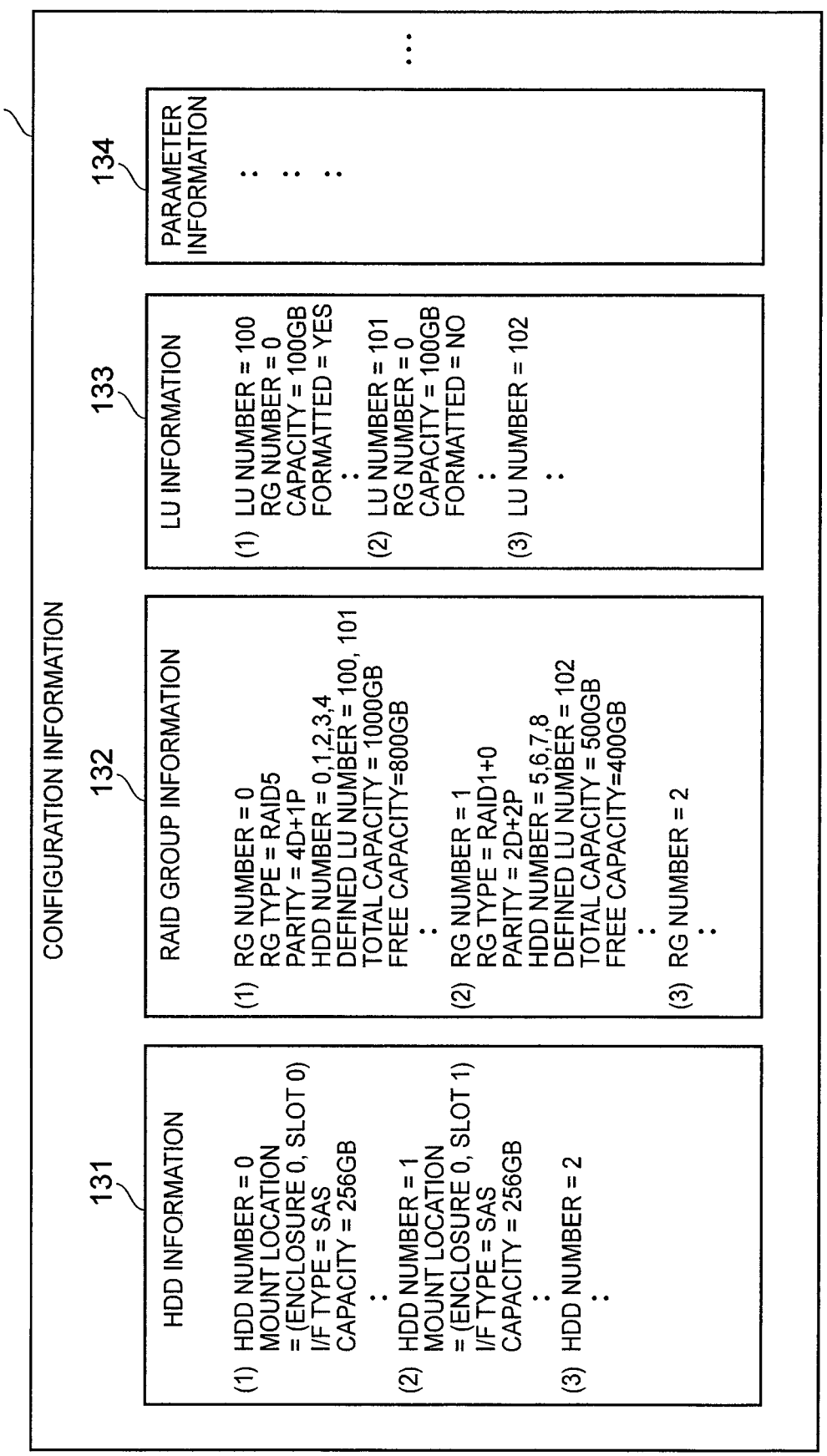
FIG. 3 shows an example of configuration information 130 comprised in system information 190 inside a first storage system 100.

FIG. 3 shows an example of configuration information 130 comprised in the system information 190 inside the first storage system 100.

Configuration information 130, for example, comprises HDD information 131, RAID group information 132, LU information 133, and parameter information 134.

HDD information 131 is information showing the physical configuration (storage device configuration) of the first storage device 120 of the first storage system 100. For example, the number, arrangement, and capacity of the HDD 140 can be considered as the physical configuration of the first storage device 120. According to FIG. 3, for example, it is clear that the HDD 140 having the HDD number "0" is mounted in the slot having slot number "0" in the enclosure having enclosure number "0", the interface is "SAS", and the capacity is "256 GB (gigabytes)".

The RAID group information 132 defines the configuration of the RAID group 150. The RAID group information 132 comprises an HDD number showing the HDD 140, which configures the RAID group 150, and the total capacity of the user area provided by the RAID group 150. The total capacity of the user area can be determined as follows. That is, the RAID group 150 having the RG number "0" in the figure is configured from five HDD 140 having HDD numbers "0, 1, 2, 3, 4". Then, the capacity of each of these HDD 140 is "256 GB" as revealed in the HDD information 131. Further, since the combination of data written to one stripe area of this RAID group 150 (shown as "parity" in the figure) is "4D+1P", the capacity equivalent to four HDD 140 is allocated as the user area. Therefore, the total capacity of the user area in this RAID group 150 is "1000 GB" (actually "1024 GB"), which is four times 256 GB. Furthermore, when system information 190 is stored in the HDD 140 configuring the RAID group 150, the size of this system information is subtracted from the total capacity. Further, because the free area of this RAID group 150 constitutes "800 GB", it is clear that an area of 200 GB, which is arrived at by subtracting 800 GB from 1000 GB, is currently in use.

The LU information 133 defines the configuration of the LU. The LU information 133 comprises information, such as the RG number showing the RAID group 150 of the first LU, the storage capacity of the first LU, and information denoting whether or not the first LU has been formatted, for each first LU created in the first storage device 120.

The parameter information 134 is information related to the first host 151 connected to the first storage system 100.

Figure 4B:
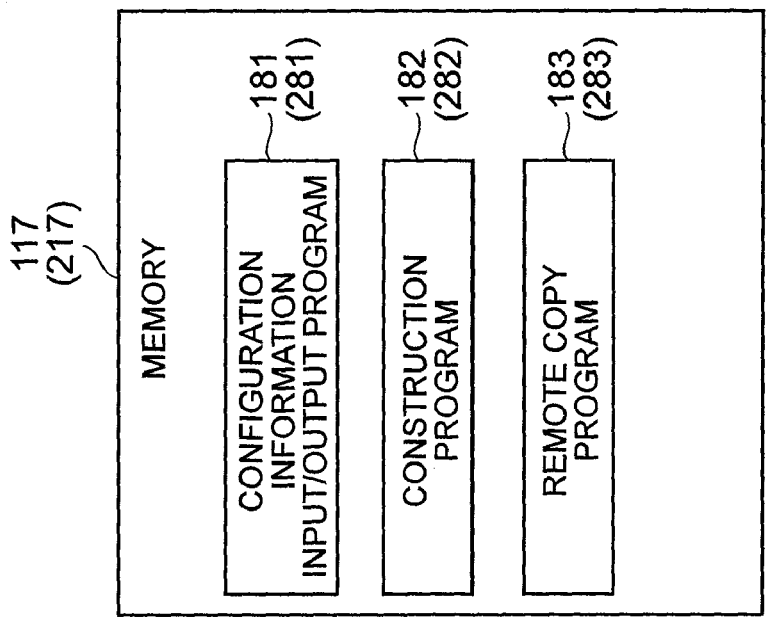
FIG. 4B shows a computer program stored in a memory 117 (217) of a controller 110 (210)
Figure 4A:
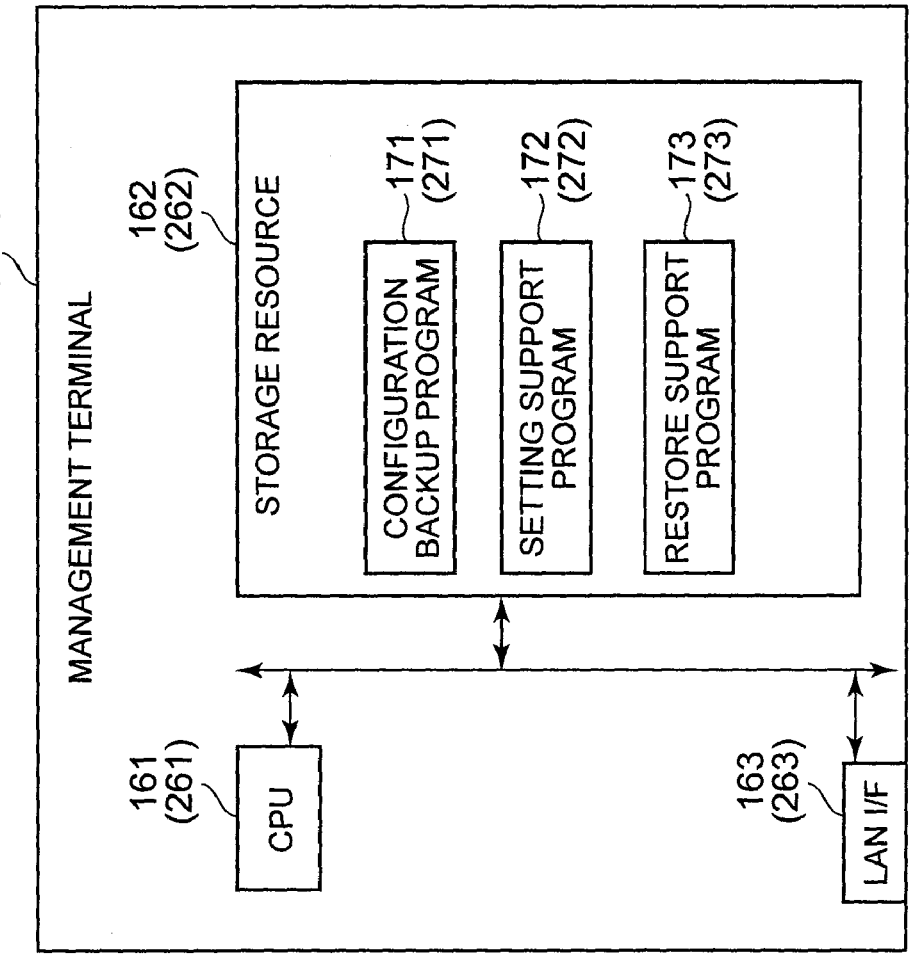
FIG. 4A shows the configuration of a management terminal 153 (253)

FIG. 4A shows the configuration of the management terminal 153 (253).

The management terminal 153 (253), for example, is a computer, such as a personal computer, and comprises a CPU 161 (261); storage resource 162 (262); and LAN I/F 163 (263). Further, although not shown in the figure, the management terminal 153 (253) comprises an input device (for example, a keyboard) and a display device (for example, a liquid crystal display).

The storage resource 162 (262), for example, is configured by a main storage device (memory) and/or an auxiliary storage device. The storage resource 162 (262), for example, stores a configuration backup program 171 (271), setting support program 172 (272), and restore support program 173 (273) as computer programs to be executed by the CPU 161 (261). The respective computer programs 171 (271), 172 (272), 173 (273) will be explained in detail hereinbelow.

FIG. 4B shows a computer program, which is stored in the memory 117 (217) of the controller 110 (210).

The memory 117 (217), for example, stores a configuration information input/output program 181 (281), construction program 182 (282) and remote copy program 183 (283) as computer programs to be executed by the CPU 116 (216). The respective computer programs 181 (281), 182 (282), 183 (283) will be explained in detail hereinbelow.

Figure 7:
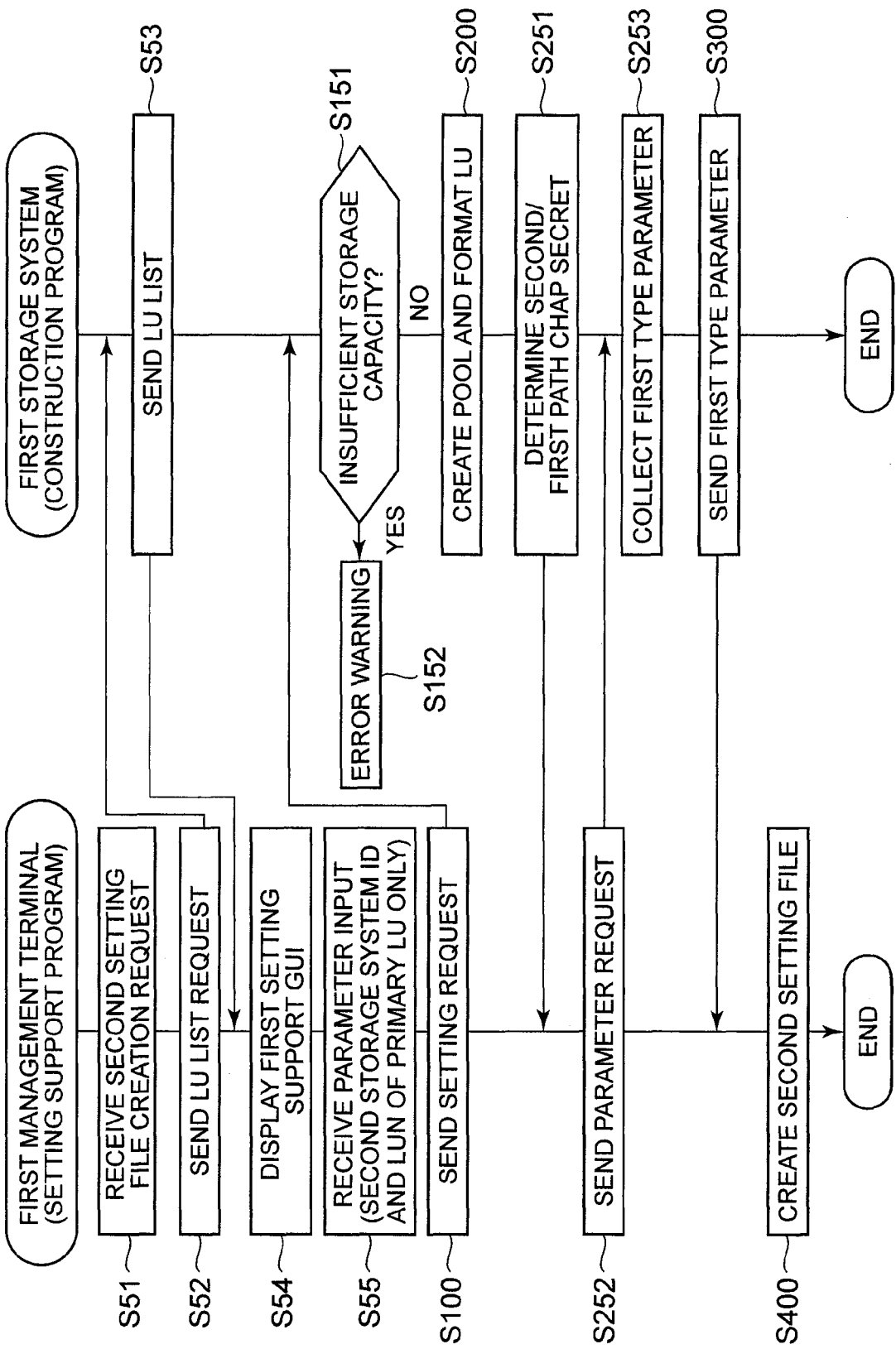
FIG. 7 shows the flow of the initial stage of processing carried out by the first embodiment.
Figure 8:
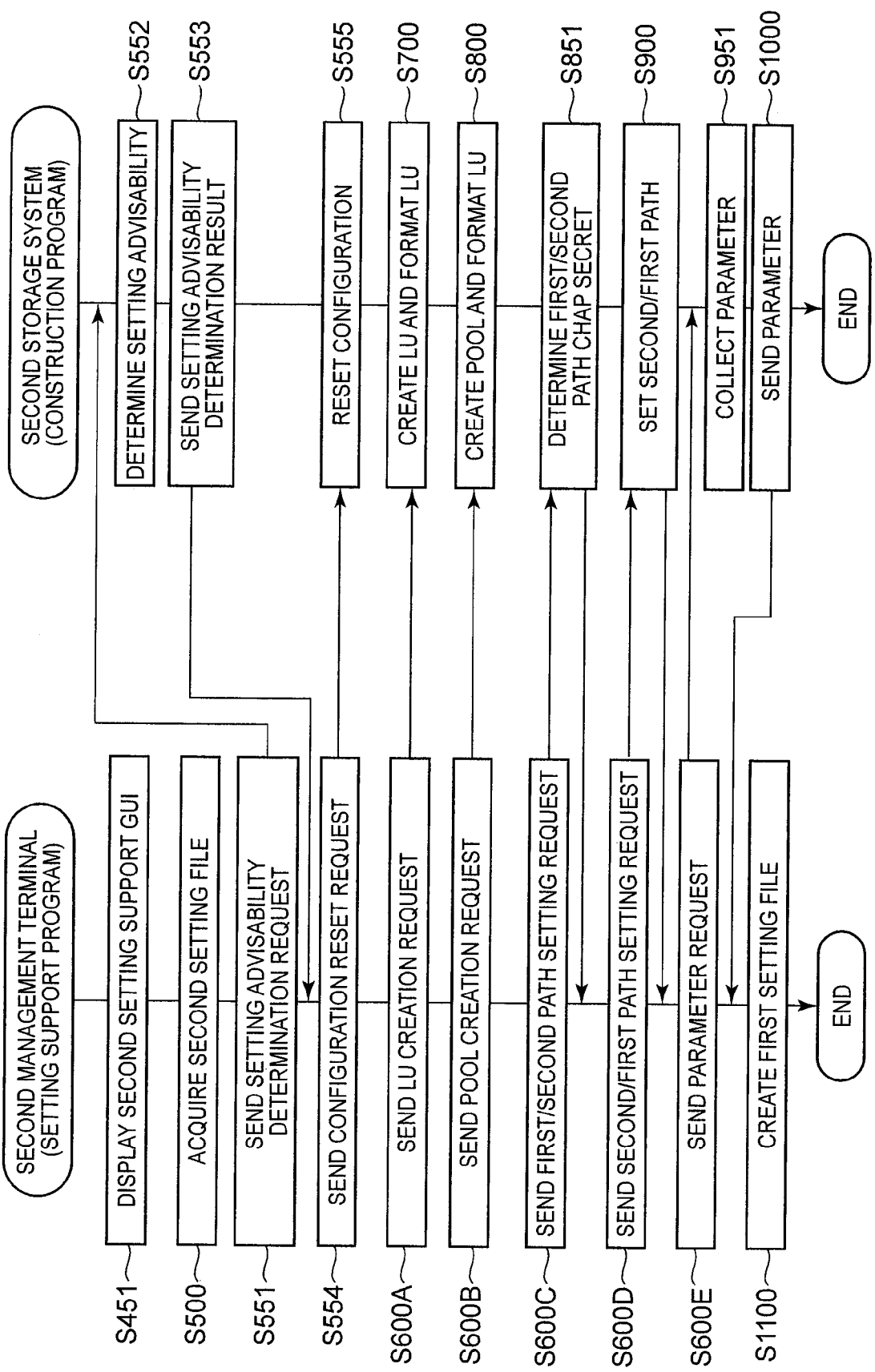
FIG. 8 shows the flow of the intermediate stage of processing carried out by the first embodiment.
Figure 9:
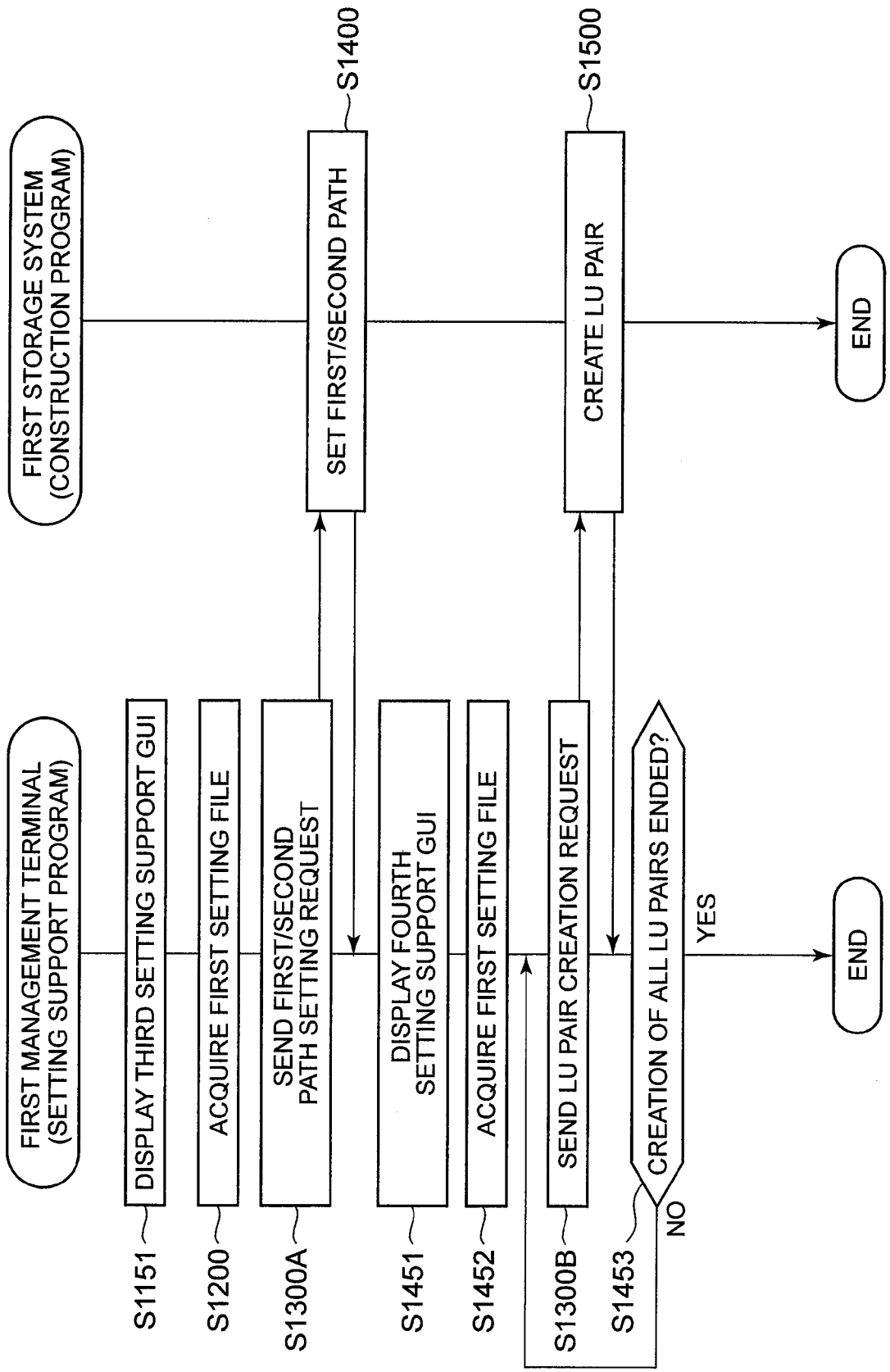
FIG. 9 shows the flow of the final stage of processing carried out by the first embodiment.

FIG. 5 shows an overview of the flow of processing carried out by the first embodiment. FIG. 7 shows the flow of the initial stage (processing up until a second setting file is created) of the process carried out by the first embodiment. FIG. 8 shows the flow of the intermediate stage (processing up until a first setting file is created) of the process carried out by the first embodiment. FIG. 9 shows the flow of the final stage (processing up until the creation of a LU pair is complete) of the process carried out by the first embodiment. The flow of processing carried out by the first embodiment will be explained below by referring to FIGS. 5, 7, 8 and 9. In the following explanation, when computer program is the subject of a sentence, the processing is actually carried out by the CPU, which executes this computer program.

The first management terminal 153, upon receiving a second setting file creation request (S51 of FIG. 7), starts up the setting support program 172. The setting support program 172 sends an LU list request to the first storage system 100 (S52 of FIG. 7).

The first storage system 100 receives the LU list request. The construction program 182 creates the LU list in response to the LU list request, and sends the created LU list to the first management terminal 153 (S53 of FIG. 7). The construction program 182, for example, can acquire the LU information 133 inside the first storage system 100, and can create a LU list, which comprises the LUN (Logical Unit Number) of all the LU inside the first storage system 100 from the acquired LU information 133.

Figure 14A:
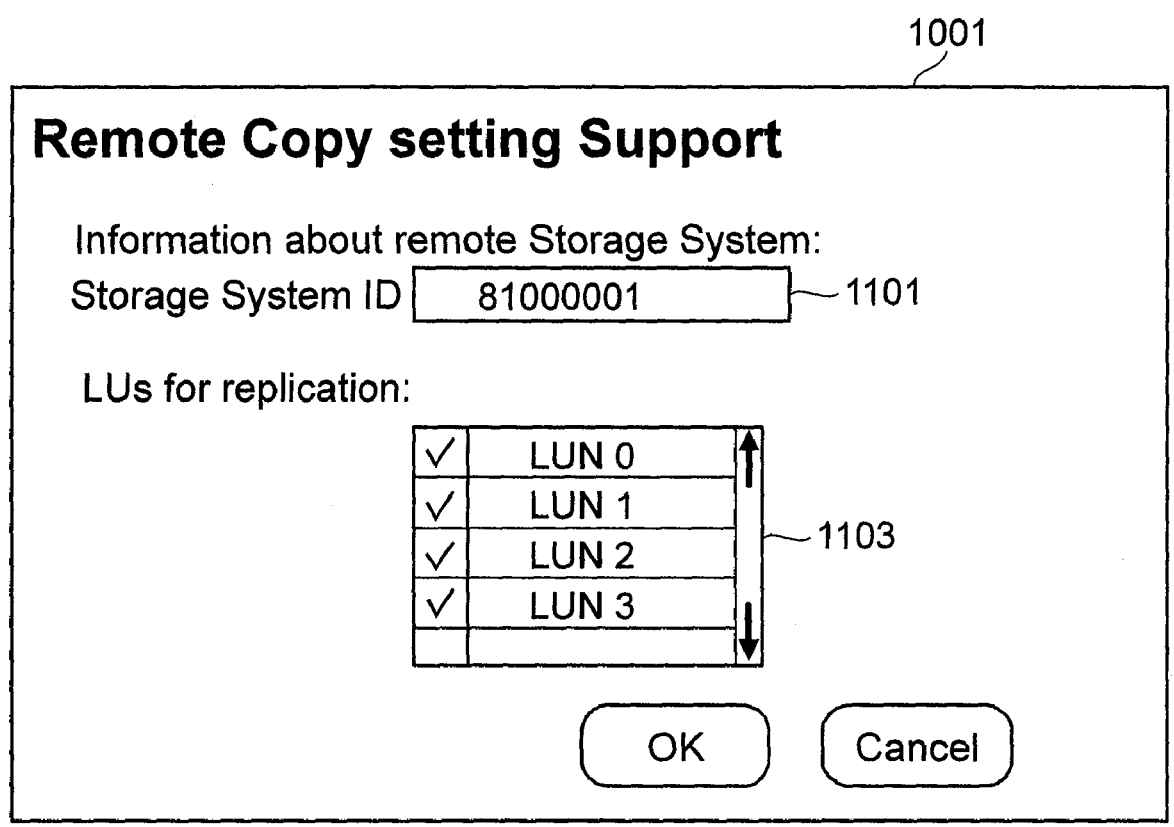
FIG. 14A shows an example of a first setting support GUI.

The setting support program 172 in the first management terminal 153 displays the first setting support GUI (Graphical User Interface) 1001 shown in FIG. 14A on the management terminal 153 display device (S54 of FIG. 7). The first setting support GUI 1001 provides a partner input column 1101 and a primary LUN specification column 1103. The partner input column 1101 is an input column for the ID (hereinafter, referred to as a "partner system ID") of the storage system, which constitutes the partner of the first storage system 100. The primary LUN specification column 1103 is a specification column for the LUN (hereinafter referred to as the "primary LUN") of the LU, which is made the primary LU (copy-source LU) from among the plurality of LU inside the first storage system 100. For example, all the LUN recorded in the LU list from the first storage system 100 are displayed in the primary LUN specification column 1103. The operator can specify the LUN of the primary LU by selecting the LUN the operator desires from among all these LUN. Furthermore, if it is necessary to make all of the LU inside the first storage system 100 primary LU, the primary LUN specification column 1103 can be eliminated from the first setting support GUI 1001. Further, if, for example, the partner storage system has been determined beforehand, the partner input column 1101 can also be eliminated. In this case, the first setting support GUI 1001 can provide a tool for receiving an indication for constructing a remote copy environment.

The operator (for example, the administrator) inputs the desired partner storage system ID (hereinafter, the partner system ID) into the partner input column, and, after selecting the LUN of the desired LU (hereinafter, the primary LUN) (S55 of FIG. 7), indicates an execution (for example, presses the "OK" button on the first setting support GUI 1001). In response to the execution indication, the setting support program 172 sends a setting request comprising a partner system ID and one or more primary LUN (S100 of FIG. 5 and FIG. 7).

The first storage system 100 receives the setting request. In response to the setting request, the construction program 182 carries out a capacity determination as to whether or not it is possible to create a pool having a prescribed storage capacity (S151 of FIG. 7). The capacity determination is carried out by referring to the LU information 133, and, for example, makes a determination as to whether or not the total storage capacity of one or more unused LU (unformatted LU) is greater than the storage capacity of the pool. If the result of the capacity determination is negative, the construction program 182 sends an error warning to the setting support program 172 (S152 of FIG. 7). If the result of the capacity determination is affirmative, the construction program 182 executes pool creation and LU formatting (S200 of FIG. 5 and FIG. 7). The execution of pool creation in S200 is the creation of a pool configured by either one or a plurality of LU. The execution of LU formatting in S200 is the formatting of the LU, which configures the pool. The pool storage capacity is a prescribed storage capacity (for example, 100 GB (gigabytes)) (a fixed value).

The construction program 182 of the first storage system 100 decides a second/first path Chap Secret (S251 of FIG. 7). The second/first path Chap Secret, for example, is a random number, and is decided automatically. The second/first path is the path used when carrying out a remote copy (for example, a data restore) from the second storage system 200 to the first storage system 100. By contrast, a first/second path, which will be explained hereinbelow, is the path used when carrying out a remote copy (for example, a data backup) from the first storage system 100 to the second storage system 200. The construction program 182 sends a response to the first management terminal 153.

The setting support program 272 inside the first management terminal 153 sends a parameter request to the first storage system 100 (S252 of FIG. 7).

The first storage system 100 receives the parameter request. In response to the parameter request, the construction program 182 collects a plurality of first type parameters (S253 of FIG. 7). The first type parameters collected at this time, for example, are listed below as (1-1) through (1-6).

(1-1) Encrypted second/first path Chap Secret,
(1-2) LU configuration information,
(1-3) Target list,
(1-4) Pool configuration information,
(1-5) First storage system ID, and
(1-6) IP address of first storage system iSCSI port.

The (1-1), for example, is acquired by encrypting the second/first path Chap Secret decided in S251 using the common key of the construction program 182.

The (1-2), for example, is the LU information 133 inside the configuration information 130.

The (1-3), for example, comprises target information comprising an iSCSI name and so forth; host system configuration information; a target option; and LU mapping. The (1-3) is created based on information stored in the first storage system. Furthermore, since the (1-3) is reproduced in the second storage system 200, of the information stored in the first storage system 100, the information element capable of duplicating the information element stored in the second storage system 200, is converted in accordance with a prescribed rule.

The (1-4), for example, is configured from a pool ID, and the LUN of the LU configuring the pool.

The (1-5) is one information element stored in the first storage system 100, and, for example, is the serial number of the first storage system 100.

The (1-6) is the IP address of a prescribed iSCSI port 115 from among the plurality of iSCSI ports 115 of the first storage system 100. That is, in the first embodiment, the iSCSI port 115 utilized in a remote copy is determined beforehand, and a remote copy cannot be carried out via a different iSCSI port 115. More specifically, in the storage system 100 (200), the controller 110 (210) is made redundant. Of the four iSCSI ports "0A" through "0D" in one controller 110, iSCSI port "0B" is decided beforehand as the iSCSI port through which the second/first path and the first/second path will pass. Therefore, the (1-6) is the IP address, which is assigned to iSCSI port "0B".

The construction program 182 inside the first storage system 100 sends the collected first type parameters (1-1) through (1-6) to the first management terminal 153 (S300 of FIG. 5 and FIG. 7).

The setting support program 172 in the first management terminal 153 creates a second setting file 298 (S400 of FIG. 5 and FIG. 7). FIG. 6A shows the configuration of the second setting file 298. The second setting file 298 comprises the partner system ID and one or more primary LUN inputted by the operator, and the (1-1) through (1-6) from the first storage system 100.

In response to a request from the operator, the setting support program 272 in the second management terminal 253 displays a second setting support GUI (S451 of FIG. 8).

The setting support program 272 in the second management terminal 253 acquires the second setting file 298 in response to a second setting support GUI operation by the operator (S500 of FIG. 5 and FIG. 8). The second setting file 298 can be sent from the first management terminal 153 (setting support program 172) via a communication network, and can be acquired by reading the second setting file 298 stored on a portable storage medium from the first management terminal 153.

The setting support program 272 in the second management terminal 253 sends a setting advisability determination request to the second storage system 200 (S551 of FIG. 8). The setting advisability determination request comprises the LU configuration information, one or more primary LUN, pool configuration information, and partner system ID from among the plurality of information elements comprised in the second setting file 298.

The second storage system 200 receives the setting advisability determination request. The construction program 282 executes a setting advisability determination in response to the setting advisability determination request (S552 of FIG. 8). The setting advisability determination comprises at least one of the following sub-determinations (A) through (C):

(A) Sub-determination as to whether or not the partner system ID matches the second storage system 200 ID,
(B) Sub-determination as to whether or not the second storage system 200 has greater free storage capacity than the total capacity of all the LU (comprising the LU configuring the pool) inside the first storage system 100, and
(C) the sub-determination as to whether or not cables are plugged into the prescribe ports 215 (ports "1B", "0B").

When the results of all the sub-determinations are affirmative, the result of the setting advisability determination becomes affirmative, and when at least one of the results of the sub-determinations is negative, the result of the setting advisability determination becomes negative. Furthermore, a setting advisability determination similar thereto can also be carried out by the construction program 182 inside the first storage system 100. For example, the construction program 182 carries out a setting advisability determination between S51 and S52 of FIG. 7 (for example, a sub-determination as to whether or not free storage capacity of greater than the prescribed storage capacity of the pool exists, and/or a sub-determination as to whether or not cables are plugged into the prescribed ports 115 (ports "1B", "0B")), and if the result thereof is negative, can carry out processing for notifying the operator of an error without executing S52 and subsequent steps.

The construction program 282 inside the second storage system 200 sends information denoting the result of the setting advisability determination to the second management terminal 253 (S553 of FIG. 8).

The second management terminal 253 receives the information denoting the result of the setting advisability determination. The setting support program 272 inside the second management terminal 253 interprets the information denoting the result of the setting advisability determination, and if the result of the setting advisability determination is affirmative, sends a configuration reset request to the second storage system 200 (S554 of FIG. 8).

The second storage system 200 receives the configuration reset request. The construction program 282 executes a configuration reset in response to the configuration reset request (S555 of FIG. 8). The execution of a configuration reset is for deleting (for example, resetting) information related to all the LU of a prescribed type, the pool and paths inside the second storage system 200. The construction program 282 sends a response to the second management terminal 253 when the configuration reset has ended.

S600 of FIG. 5 corresponds to S600A through S600E of FIG. 8.

After the second management terminal 253 receives the configuration reset end response from the second storage system 200, the setting support program 272 sends a LU creation request to the second storage system 200 (S600A of FIG. 8).

The second storage system 200 receives the LU creation request. The construction program 282 executes LU creation and LU formatting in response to the LU creation request (S700 of FIG. 5 and FIG. 8). The execution of LU creation in S700 creates one or more secondary LU (copy-target LU), which respectively configure a pair with one or more primary LU. At this time, for example, the storage capacity and LUN of the created secondary LU is made the same as the primary LU storage capacity and LUN, which is recorded in the LU configuration information. The execution of the LU formatting in S700 formats the one or more created secondary LU. The construction program 282 sends a response to the second management terminal 253 when LU creation and LU formatting have ended.

After the second management terminal 253 receives the LU creation and LU formatting end responses from the second storage system 200, the setting support program 272 sends a pool creation request to the second storage system 200 (S600B of FIG. 8).

The second storage system 200 receives the pool creation request. The construction program 282 executes pool creation and LU formatting in response to the pool creation request (S800 of FIG. 5 and FIG. 8). The execution of pool creation in S800 creates a pool of a prescribed storage capacity (for example, 100 GB). At this time, for example, the pool configuration can be the same as the configuration described in the pool configuration information in the second setting file 298. The execution of the LU formatting in S800 formats the LU configuring the created pool. The construction program 282 sends a response to the second management terminal 253 when pool creation and LU formatting have ended.

After the second management terminal 253 receives the pool creation and LU formatting end responses from the second storage system 200, the setting support program 272 sends a first/second path setting request to the second storage system 200 (S600C of FIG. 8).

The second storage system 200 receives the first/second path setting request. In response to the first/second path setting request, the construction program 282 decides the first/second path Chap Secret (S851 of FIG. 8). The first/second path Chap Secret, for example, is a random number, and is determined automatically. The construction program 282 sends a response to the second management terminal 253 when the first/second path Chap Secret determination has ended.

After the second management terminal 253 receives the first/second path Chap Secret determination end response from the second storage system 200, the setting support program 272 sends a second/first path setting request to the second storage system 200 (S600D of FIG. 8). The second/first path setting request comprises the encrypted second/first path Chap Secret, the first storage system 100 ID, and the IP addresses of the iSCSI ports 115 (ports "0B" and "1B" shown in FIG. 5) of the first storage system 100 from among the plurality of information elements comprised in the second setting file 298.

The second storage system 200 receives the second/first path setting request. The construction program 282 configures a second/first path in response to the second/first path setting request (S900 of FIG. 5 and FIG. 8). Either all or a prescribed portion of the following (A1) through (A7) parameters are configured in the second/first path:

(A1) Second/first path Chap Secret,
(A2) ID of first storage system 100,
(A3) IP address of iSCSI port 115 of first storage system 100,
(A4) Line bandwidth,
(A5) Used port ID,
(A6) TCP (Transmission Control Protocol) port number, and
(A7) Time-out time.

Parameter (A1) is acquired by decrypting the encrypted second/first path Chap Secret (information element inside the second/first path setting request) using the common key of the construction program 282. Parameters (A2) and (A3) are parameters comprised in the second/first path setting request. Parameters (A4) through (A7) are predetermined fixed values. Incidentally, parameter (A4) is the line bandwidth of the second/first path. Parameters (A5) and (A6) are the ID and numbers of the ports "0B" and "1B" in the second storage system 200. Parameter (A7) is the length of the time-out time of communications via the second/first path. Parameter (A7) (the time-out time length) can also be computed from parameter (A4) (line bandwidth). The construction program 282 sends a response to the second management terminal 253 when the second/first path setting has ended.

After the second management terminal 253 receives the second/first path setting end response from the second storage system 200, the setting support program 272 sends a parameter request to the second storage system 200 (S600E of FIG. 8).

The second storage system 200 receives the parameter request. In response to the parameter request, the construction program 282 collects a plurality of second type parameters (S951 of FIG. 8). The second type parameters collected at this time, for example, comprise the following (2-1) through (2-3) parameters:

(2-1) encrypted first/second path Chap Secret,
(2-2) LU pair information, and
(2-3) IP address of the iSCSI port 215 of the second storage system.

The (2-1), for example, is acquired by encrypting the first/second path Chap Secret determined in S851 using the construction program 182 common key.

The (2-2) is information comprising a primary LUN/secondary LUN group for each LU pair.

The (2-3) is the IP addresses of prescribed iSCSI ports 215 (the ports "0B" and "1B" in FIG. 5) from among the plurality of iSCSI ports 215 of the second storage system 200.

The construction program 282 inside the second storage system 200 sends the collected second type parameters (2-1) through (2-3) to the second management terminal 253 (S1000 of FIG. 5 and FIG. 8).

The setting support program 272 in the second management terminal 253 creates the first setting file 198 (S1100 of FIG. 5 and FIG. 8). FIG. 6B shows the configuration of the first setting file 198. The first setting file 198 comprises the partner system ID (the ID of the second storage system 200) acquired from the second setting file 298, and the (2-1) through (2-3) from the second storage system 200.

The setting support program 172 in the first management terminal 153 displays a third setting support GUI in response to a request from the operator (S1151 of FIG. 9).

Step S1300 of FIG. 5 corresponds to S1300A and S1300B of FIG. 9.

The setting support program 172 in the first management terminal 153 acquires the first setting file 198 in response to a third setting support GUI operation by the operator (S1200 of FIG. 5 and of FIG. 9). The first setting file 198 can be sent from the second management terminal 253 (setting support program 272) via a communication network, and can be acquired by reading the first setting file 198 stored on a portable storage medium from the second management terminal 253.

The setting support program 172 in the first management terminal 153 sends a first/second path setting request to the first storage system 100 (S1300A of FIG. 9). The first/second path setting request comprises the encrypted first/second path Chap Secret, the ID of the second storage system 200, and the IP addresses of the iSCSI ports 215 (ports "0B" and "1B" shown in FIG. 5) of the second storage system 200, from among the plurality of information elements comprised in the first setting file 198.

The second storage system 200 receives the second/first path setting request. The construction program 282 configures a second/first path in response to the second/first path setting request (S900 of FIG. 5 and FIG. 9). Either all or a prescribed portion of the following (B1) through (B7) parameters are configured in the first/second path:

(B1) First/second path Chap Secret, (B2) ID of second storage system 200, (B3) IP address of iSCSI port 215 of second storage system 200, (B4) Line bandwidth, (B5) Used port ID, (B6) TCP (Transmission Control Protocol) port number, and (B7) Time-out time.

Parameter (B1) is acquired by decrypting the encrypted first/second path Chap Secret (information element inside the first/second path setting request) using the common key of the construction program 182. Parameters (B2) and (B3) are parameters comprised in the first/second path setting request. Parameters (B4) through (B7) are predetermined fixed values. Incidentally, parameter (B4) is the line bandwidth of the first/second path. Parameters (B5) and (B6) are the ID and numbers of the ports "0B" and "1B" in the first storage system 100. Parameter (B7) is the length of the time-out time of communications via the first/second path. Parameter (B7) (the time-out time length) can also be computed from parameter (B4) (line bandwidth). The construction program 182 sends a response to the first management terminal 153 when the first/second path setting has ended.

After the first management terminal 153 receives the first/second path setting end response from the first storage system 100, the setting support program 172 displays a fourth setting support GUI (S1451 of FIG. 9).

The setting support program 172 in the first management terminal 153 acquires the first setting file 198 in response to a fourth setting support GUI operation by the operator (refer to FIG. 5, and S1452 of FIG. 9). Furthermore, since the first setting file 198 is acquired in S1200, this S1452 can be omitted. Further, S1451 can also be eliminated.

The setting support program 172 inside the first management terminal 153 sends a LU pair request to the first storage system 100 (S1300B of FIG. 9). The setting support program 172 executes S1300B for the LU pairs specified from the LU pair information inside the first setting file 198 (S1453 of FIG. 9). For example, upon receiving a response to the LU pair creation request, the setting support program 172 sends a LU pair creation request for a different LU pair to the first storage system 100. The LU pair creation request comprises the groups of primary LUN and secondary LUN comprised in the LU pair information inside the first setting file 198.

The first storage system 100 receives the LU pair creation request. The construction program 182 executes LU pair creation in response to the LU pair creation request (S1500 of FIG. 5 and FIG. 9). The execution of LU pair creation creates a LU pair by setting the primary LUN/secondary LUN group of the LU pair creation request in the memory 117 of the first storage system 100.

The construction program 182 of the first storage system 100 sends a response to the first management terminal 153 each time an LU pair creation ends.

Furthermore, either after creating each LU pair, or after creating all the LU pairs, the construction program 182, by calling up the remote copy program 183, can execute a remote copy (a copy that does not go by way of the host 151 (251)) of data to the secondary LU from the primary LU configuring the LU pair. In this case, the data stored in the primary LU is copied to the secondary LU for each LU pair.

The construction of a remote copy environment is completed in accordance with the above-described series of processes.

According to the above-described processing, information elements are exchanged between the storage systems 100 and 200 via the management terminal 153 (253). This, it is possible to reduce the information elements that the operator is required to input. For example, since the IP address of the iSCSI port 115 (215) is exchanged between the storage systems 100 and 200, the operator need not input the iSCSI port 115 (215) IP address.

Further, according to the processing described above, the partner IP address and first storage system 100 ID of the information elements inside the second setting file 298 are not inherited as the IP address and ID of the second storage system 200. This is because the second storage system 200 has an IP address and a unique ID.

Further, according to the above-described processing, for example, the LU configuration information and/or target list of the information elements inside the second setting file 298 are inherited by the second storage system 200. An information element that is at risk of being duplicated inside the second storage system 200 is converted using prescribed rules so as not be to duplicated, and thereafter, either included in the LU configuration information and/or target list, or inherited by the second storage system 200.

Therefore, a plurality of LU, which configures respective LU pairs with all the LU inside the first storage system 100, can be constructed inside the second storage system 200 in accordance with the above-described series of processes. That is, the configuration can be such that the data stored in all the LU in the first storage system 100 is backed up to the second storage system 200.

Further, the configuration backup program 171 of the first management terminal 153 can send a configuration backup request to the first storage system 100. In this case, in response to the configuration backup request, the configuration information input/output program 181 of the first storage system 100 acquires the configuration information 130 from inside the system information 190, and sends a file denoting the acquired configuration information 130 (hereinafter, the configuration file) to the first management terminal 153. This configuration file is outputted from the first management terminal 153, and inputted to the second management terminal 253 (for example, this file is sent from the first management terminal 153 to the second management terminal 253 by way of a communication network).

The configuration backup program 271 of the second management terminal 253 sends a configuration save request together with the inputted configuration file to the second storage system 200.

In response to the configuration save request, the configuration information input/output program 281 of the second storage system 200 saves the configuration file received together with the configuration save request to the memory 217 and/or the HDD 240.

Figure 10:
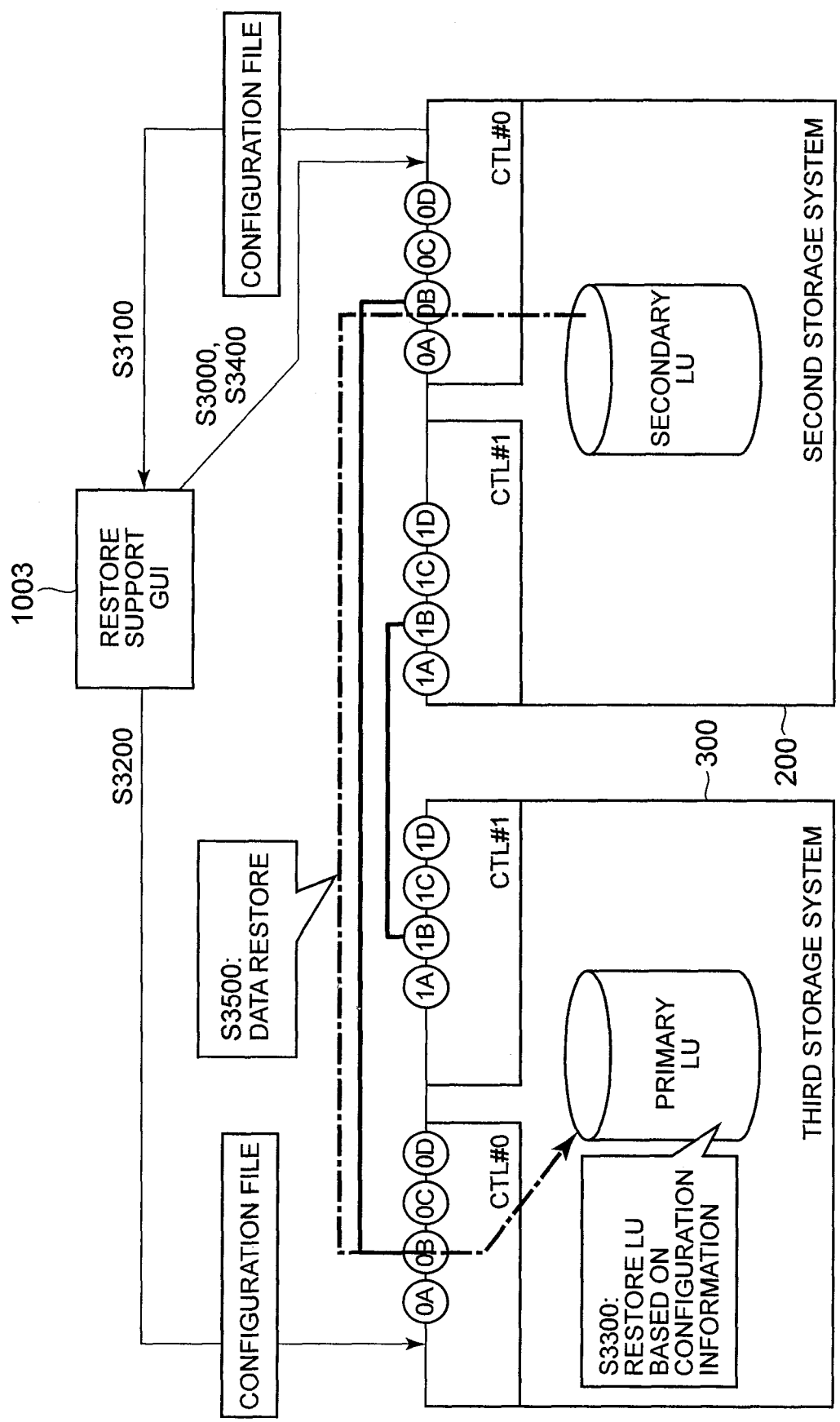
FIG. 10 shows an overview of a restore process carried out by the first embodiment.

It is supposed that a failure occurs in the first storage system 100 thereafter. In this case, as shown in FIG. 10, a third storage system 300 is connected to the second storage system 200 in place of the first storage system 100 (for example, the old storage system). Thus, the first management terminal 153 is connected to the third storage system 300 (a third management terminal can be connected in place of the first management terminal 153). The setting of a path (a second/third path) for remote copying data from the third storage system 300 to the second storage system 200, for example, can be carried out the same way as the flow of processing for setting the second/first path, which was explained by referring to FIGS. 5, 7, 8 and 9.

Figure 14B:
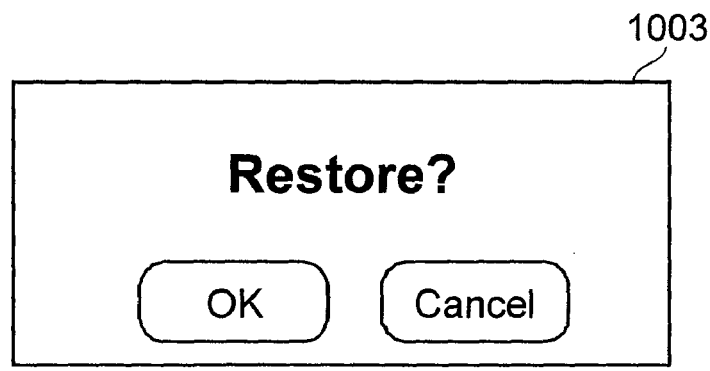
FIG. 14B shows an example of a restore support GUI.

For example, the restore support program 273 of the second management terminal 253 displays the restore support GUI 1003 shown in FIG. 14B on the second management terminal 253 display device. The restore support GUI 1003 is for receiving a restore indication from the operator.

The restore support program 273 sends a configuration read request to the second storage system 200 upon receiving a restore indication from the operator by way of the restore support GUI 1003 (S3000 of FIG. 10).

The configuration information input/output program 281 of the second storage system 200, in response to the configuration read request, reads the configuration file from the memory 217 and/or the HDD 240, and sends the read configuration file to the second management terminal 253 (S3100 of FIG. 10).

This configuration file is outputted from the second management terminal 253, and inputted to the first management terminal 153 (for example, the file is sent from the second management terminal 253 to the first management terminal 153 via a communication network).

The restore support program 173 of the first management terminal 153 sends a configuration restore request together with the inputted configuration file to the third storage system 300 (S3200 of FIG. 10).

In response to the configuration restore request, a configuration information input/output program inside the third storage system 300 stores configuration information denoted by the configuration file received together with the configuration restore request in an HDD, and based on this configuration information, restores a plurality of LU (primary LU) denoted by the LU information in this configuration information (S3300 of FIG. 10). For example, an LU is restored by setting a prescribed type information element of the LU information in the controller memory. When the LU restore has ended, a response is returned from the third storage system 300 to the first management terminal 153, and this response, for example, is sent from the first management terminal 153 to the second management terminal 253.

Thereafter, the configuration of a pair comprising a primary LU restored in the third storage system 300 and a secondary LU of the second storage system 200, for example, can be carried out in the same way as the flow of processing for setting the second/first path, which was explained by referring to FIGS. 5, 7, 8, and 9. Or, for example, LU pair information from the first storage system 100 can be sent to the second storage system 200 either via or not via the management terminal 153 (253) prior to a failure occurring, and the second storage system 200 can store this LU pair information. The second storage system 200 can be made aware of the secondary LU/primary LU groups no matter which method is used.

Upon receiving a response thereto, the restore support program 273 of the second management terminal 253 sends a data restore request to the second storage system 200.

In response to the data restore request, the remote copy program 283 of the second storage system 200 copies the data inside the respective secondary LU to the respective restored primary LU via the second/third path (S3500 of FIG. 10).

According to the series of processes described hereinabove, all (or a portion) of the LU inside the first storage system 100 can be restored to the third storage system 300. According to this processing flow, the operator need only specify a restore indication on the restore support GUI 1003 to realize this restore.

Furthermore, when the configuration information is written to the third storage system 300, either the restore support program 173 of the first management terminal 153, or the configuration information input/output program of the third storage system 300 can correct the contents of either the configuration file or the configuration information.

Figure 15:
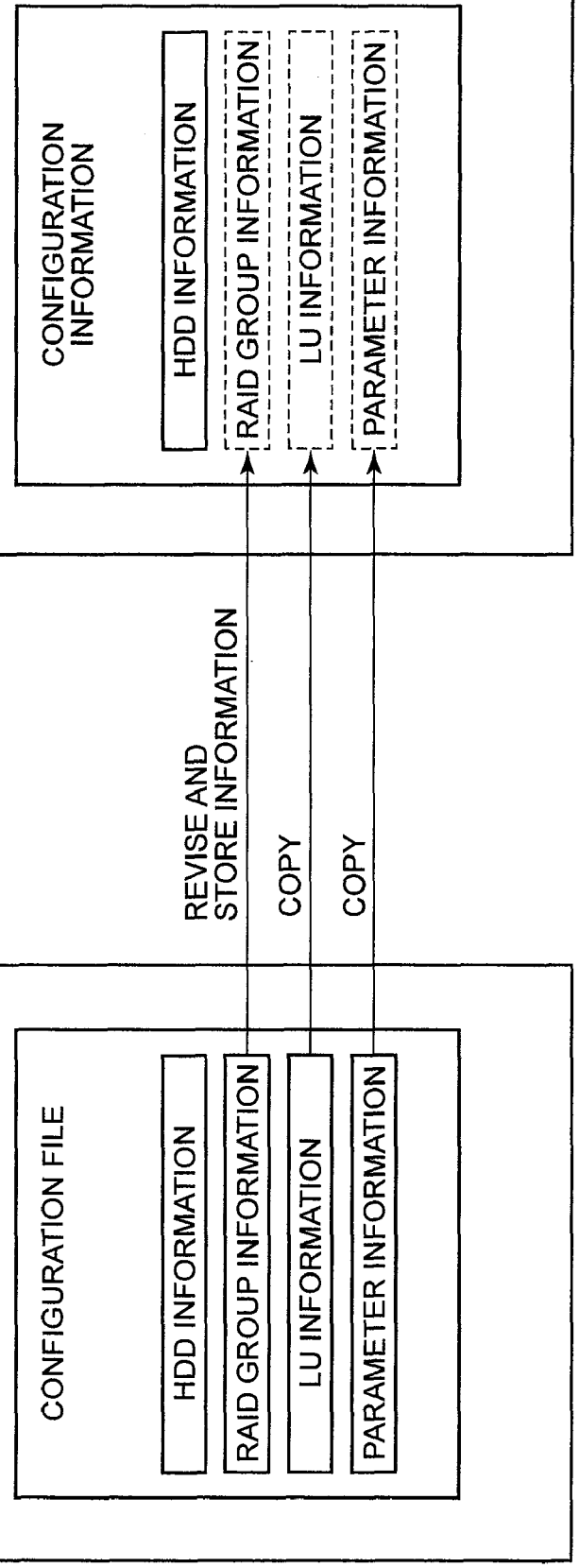
FIG. 15 shows a variation of a restore of configuration information by the first embodiment.

For example, as shown in FIG. 15, the RAID group information 132, LU information 133 and parameter information 134 of the configuration file is stored in the third storage system 300, but the HDD information is not stored in the third storage system 300. Further, the LU information and parameter information, for example, is stored as-is without being corrected. The following point is focused on in the RAID group information 132. That is, when the storage device configurations of the first storage system 100 and the third storage system 300 differ, the third storage system 300 may not operate normally even if the RAID group information 132 is stored as-is in the third storage system 300. This is because the RAID group information 132 comprises the HDD number and total capacity of the RAID group 150 determined based on the storage device configuration. Accordingly, the RAID group information 132 is normally stored after being corrected so as to conform to the storage device configuration of the third storage system 300. In terms of specific processing, for example, corrected new RAID group information is created in the first management terminal 153, and this created new RAID group information is stored in the third storage system 300. Furthermore, when the storage device configurations are the same, the RAID group information inside the configuration file is stored as-is to the third storage system 300.

Second Embodiment

A second embodiment of the present invention will be explained below. In so doing, the explanation will focus mainly on the points of difference with the first embodiment, and the explanations of points shared in common with the first embodiment will be either abbreviated or omitted. The same will also hold true for the third and fourth embodiments, which will be explained hereinbelow.

Figure 11:
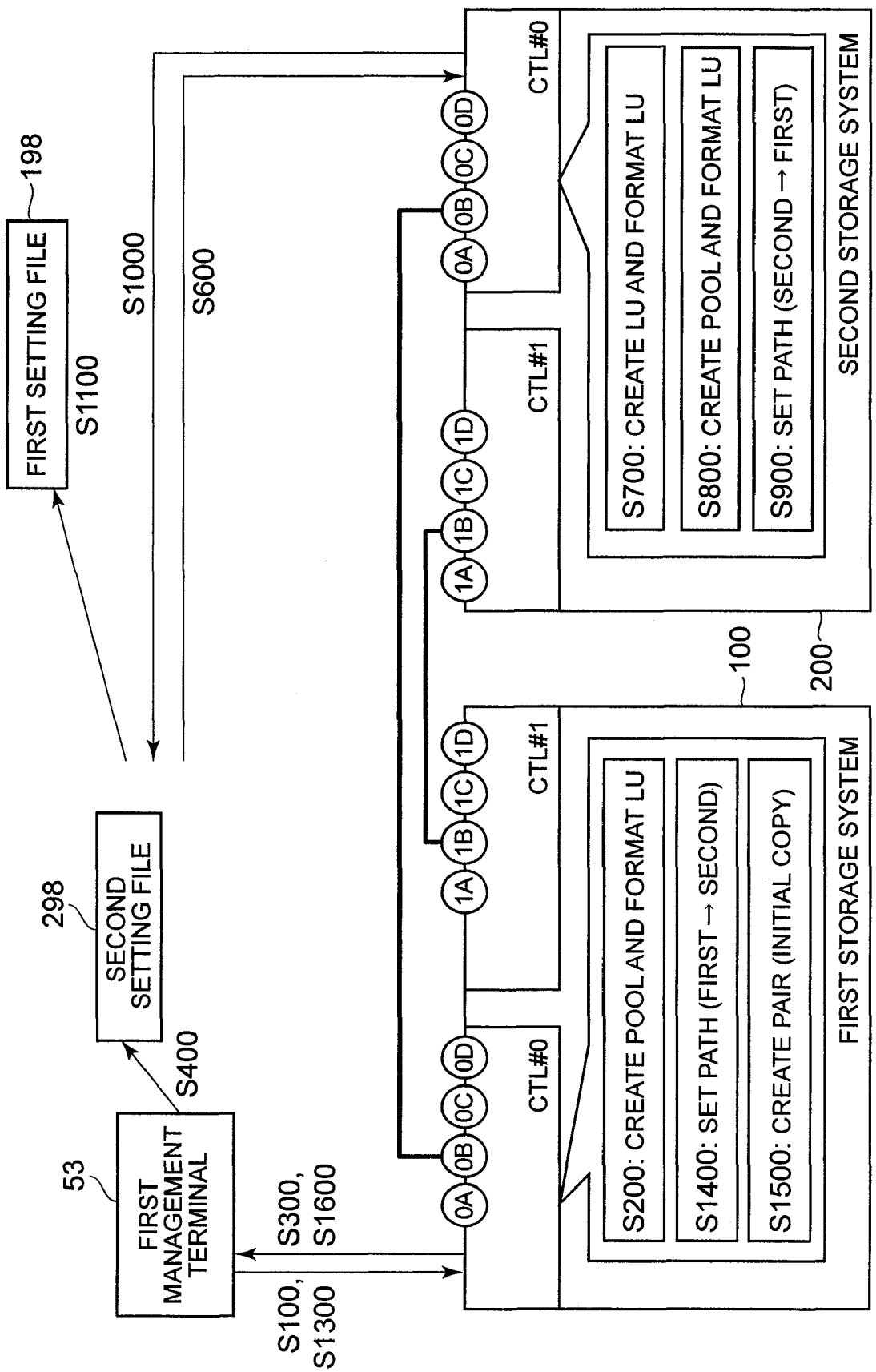
FIG. 11 shows an overview of the flow of processing carried out by a second embodiment of the present invention.

FIG. 11 shows an overview of the flow of processing carried out by the second embodiment of the present invention.

In the second embodiment, the first management terminal 153 and the second management terminal 253 are integrated into a single management terminal 53. The management terminal 53 is connected to both the first storage system 100 and the second storage system 200 (for example, the management terminal 53 is connected via a communication network).

Therefore, for example, S500 and S1200 explained using the first embodiment are not necessary.

Third Embodiment

Figure 12:
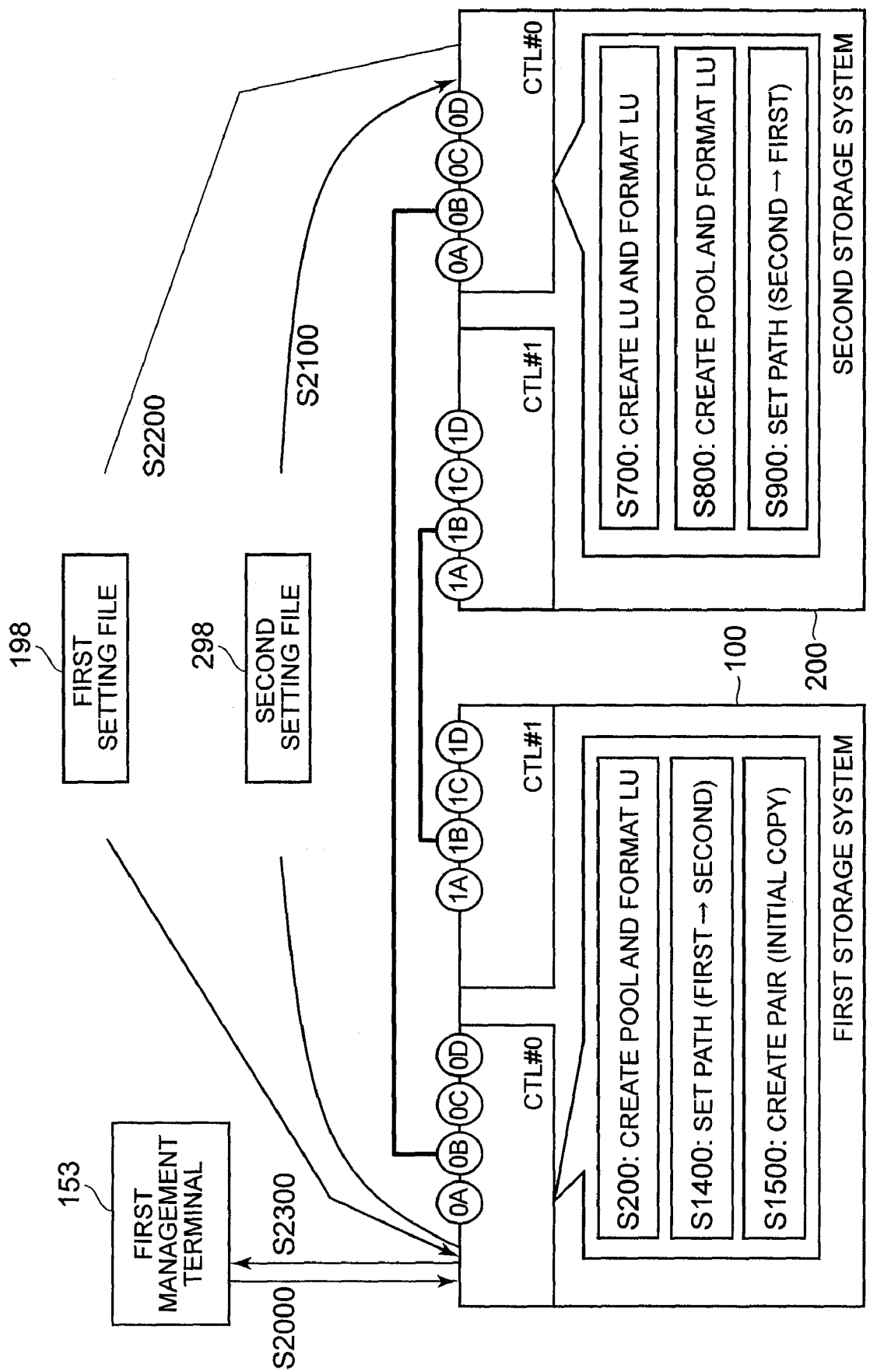
FIG. 12 shows an overview of the flow of processing carried out by a third embodiment of the present invention.

FIG. 12 shows an overview of the flow of processing carried out by a third embodiment of the present invention.

In the third embodiment, the first setting file 198 and the second setting file 298 are directly exchanged between the storage systems 100 and 200. Further, the second management terminal 253 is unnecessary.

More specifically, for example, in the third embodiment, S2000 is used in place of S100 of the first embodiment. In S2000, a remote copy environment construction request comprising a partner system ID and one or more primary LUN is sent.

In response to the remote copy environment construction request, S200 and S2100 are executed. In S2100, the controller 110 creates the second setting file 298 comprising the collected first type parameters, and sends this second setting file 298 from the first storage system 100 to the second storage system 200 by way of an interface that differs from the iSCSI port 115 (for example, the LAN I/F) without going through the first management terminal 153. That is, S2100 is used instead of S300, S400 and S500 of the first embodiment.

In the second storage system 200, S700, S800 and S900 are executed when inputting is carried out to the second setting file 298. Further, the controller 210 creates the first setting file 198 comprising the collected second type parameters, and sends the first setting file 198 from the second storage system 200 to the first storage system 100 by way of either an interface that differs from the iSCSI port 215 (for example, the LAN I/F) or the set second/first path (S2200 of FIG. 11). That is, S2200 is used in place of S1000, S1100, S1200 and S1300 of the first embodiment. S1400 and S1500 are executed when the first setting file 198 is inputted to the first storage system 100.

Finally, S2300 is executed instead of S1600 of the first embodiment. In S2300, the controller 110 sends a response relative to the remote copy environment construction request (remote copy environment construction end response) to the first management terminal 153.

Fourth Embodiment

Figure 13:
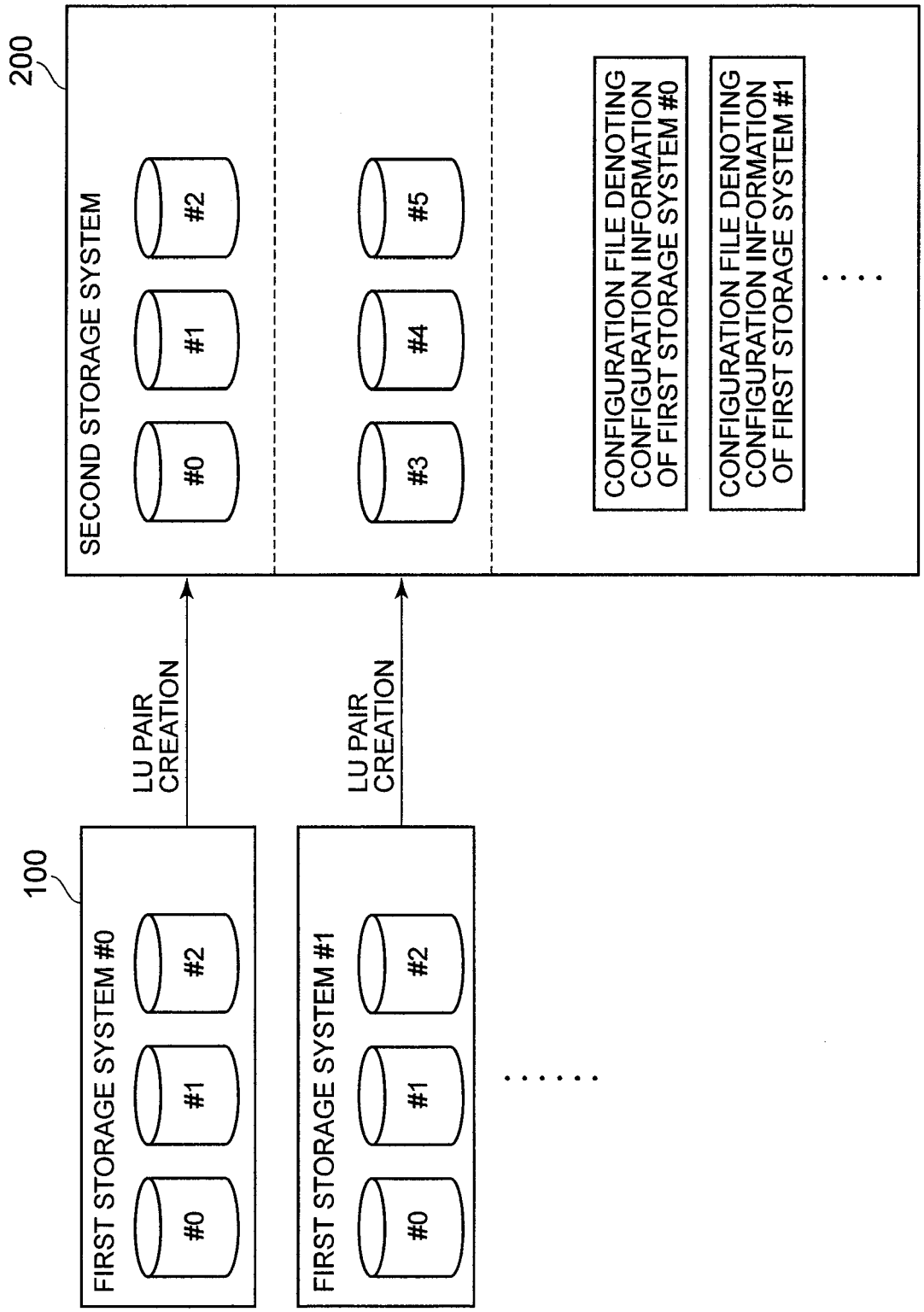
FIG. 13 shows an overview of a fourth embodiment of the present invention.

FIG. 13 shows an overview of a fourth embodiment of the present invention.

N (N being an integer of no less than 2) first storage systems 100 are communicably connected to one second storage system 200. The total storage capacity of the storage devices 220 in the second storage system 200 is greater than the storage capacity of the storage devices 120 in the N first storage systems 100.

In this case, for example, an LU pair is created for each first storage system 100. LU pair creation can create a secondary LU, which has the same LUN as the LUN of the primary LU by copying the LU information 133 of the first storage system 100 as-is to the second storage system 200, and can create a pair of LU having the same LUN.

However, there is a risk of LUN being duplicated when there are two or more first storage systems 100. In this case, LUN duplication will occur inside the second storage system 200 when the LU information 133 of the respective first storage systems 100 is set as-is in the second storage system 200.

Accordingly, when setting the LU information 133 in the second storage system 200, the construction program 182 of the second storage system 200 determines whether or not the LUN inside the LU information 133 of the setting target duplicates the LUN of the LU already residing in the second storage system 200. If there is no duplication, this LU information 133 is set as-is, and if there is duplication, the LUN inside the setting targeted LU information 133 is converted to a LUN that does not duplicate the LUN of the LU that already resides in the second storage system 200, and sets the LU information 133 comprising the post-conversion LUN. Consequently, for example, when the three LU of LUN0, LUN1 and LUN2, respectively reside in the first storage systems #0 and #1, three LU having the same LUN0, LUN1 and LUN2 are created in the second storage system 200 for the three LU inside first storage system #0, but three LU having LUN3, LUN4 and LUN5, which do not duplicate the same LUN0, LUN1 and LUN2, are created in the second storage system 200 for the three LU inside first storage system #1.

Further, in the fourth embodiment, the configuration information input/output program 281 of the second storage system 200 saves the configuration file fir each first storage system 100. In this case, for example, when a failure occurs in first storage system #1, only the configuration file, which is mapped to first storage system #1, of N number of configuration files, is read from the second storage system 200.

The numerous embodiments of the present invention described hereinabove are examples for explaining the present invention, and do not purport to limit the scope of the present invention to these embodiments. The present invention can be put into practice in a variety of other ways without departing from the gist thereof.

For example, at least one of the computer programs 171 (271), 172 (272) and 173 (273) executed by management terminal 153 and/or 253 can reside in another device (for example, either the host 151 (251) or the controller 110 (210)). In this case, management terminal 153 and/or 253 can function as input/output consoles.

Further, the processing flows disclosed in at least one of the figures from among FIG. 5 and FIGS. 7 through 11 show overviews of the respective processes to the extent necessary to understand and implement the present invention. Therefore, a so-called person having ordinary skill in the art will be able to change the order of the steps, and/or change a step to a different step without departing from the scope of the present invention.

What is claimed is:

1. A remote copy system, comprising:
    a first storage system;
    a second storage system connected to the first storage system; and
    a first operator interface for receiving the input of a prescribed type information element from an operator,
    wherein the first storage system comprises a plurality of first logical volumes, a plurality of first communication ports, and a first controller,
    wherein the second storage system comprises a plurality of second communication ports, and a second controller,
    wherein the first controller comprises:
    a first acquisition unit that acquires a plurality of first type information elements, which constitute a plurality of elements of second setting information;
    a first output unit that outputs the acquired plurality of first type information elements;
    a first input unit that inputs first setting information, comprising a plurality of second type information elements; and
    a first setting unit that executes a first setting required to construct a remote copy environment, based on the plurality of second type information elements, which are comprised in the first setting information, and the plurality of first type information elements, wherein the remote copy environment is an environment, which enables to copy data between a certain first logical volume of the plurality of first logical volumes and a certain second logical volume by way of a certain first communication port of the plurality of first communication ports and a certain second communication port of the plurality of second communication ports, wherein the second setting information is information, which is inputted to the second storage system, and is used in a second setting required for constructing the remote copy environment, wherein the first setting information is information, which is inputted to the first storage system, and is used in the first setting, and wherein the second controller comprises:

a second input unit that inputs the second setting information, which comprises the plurality of first type information elements, and a prescribed type information element inputted to the first operator interface;

a second setting unit that executes the second setting based on the plurality of first type information elements and the prescribed type information element;

a second acquisition unit that acquires the plurality of second type information elements, which constitute the plurality of information elements of the first setting information; and a second output unit that outputs the acquired plurality of second type information elements, wherein the number of the prescribed types is a smaller number than the types of information elements required for constructing the remote copy environment, wherein the prescribed type information element is volume identification information of the certain first logical volume, wherein the first acquisition unit acquires a storage capacity of the certain first logical volume as the first type information element, wherein the second acquisition unit acquires volume identification information of a second logical volume, which is the certain second logical volume for configuring a volume pair with the certain first logical volume, and which has a storage capacity that is equal to or greater than the storage capacity of the certain first logical volume, and in the first setting, volume pair information, which comprises the volume identification information of the certain first logical volume and the volume identification information of the certain second logical volume, is set, wherein one second storage system is connected to a plurality of first storage systems, and the volume identification information is a volume number, and wherein the second acquisition unit, as a rule, acquires, as the volume number of the certain second logical volume, the same volume number as the volume number of the certain first logical volume, and as an exception to that rule, acquires a volume number that differs from the volume number of the certain first logical volume when the same volume number as the volume number of the certain first logical volume has already been set.

2. A remote copy system, comprising:

a first storage system;

a second storage system connected to the first storage system; and a first operator interface for receiving the input of a prescribed type information element from an operator, wherein the first storage system comprises a plurality of first logical volumes, a plurality of first communication ports, and a first controller, wherein the second storage system comprises a plurality of second communication ports, and a second controller, and wherein the first controller comprises:

a first acquisition unit that acquires a plurality of first type information elements, which constitute a plurality of elements of second setting information;

a first output unit that outputs the acquired plurality of first type information elements;

a first input unit that inputs first setting information, comprising a plurality of second type information elements; and a first setting unit that executes a first setting required to construct a remote copy environment, based on the plurality of second type information elements, which are comprised in the first setting information, and the plurality of first type information elements, wherein the remote copy environment is an environment, which enables to copy data between a certain first logical volume of the plurality of first logical volumes and a certain second logical volume by way of a certain first communication port of the plurality of first communication ports and a certain second communication port of the plurality of second communication ports, wherein the second setting information is information, which is inputted to the second storage system, and is used in a second setting required for constructing the remote copy environment, wherein the first setting information is information, which is inputted to the first storage system, and is used in the first setting, and wherein the second controller comprises:

a second input unit that inputs the second setting information, which comprises the plurality of first type information elements, and a prescribed type information element inputted to the first operator interface;

a second setting unit that executes the second setting based on the plurality of first type information elements and the prescribed type information element;

a second acquisition unit that acquires the plurality of second type information elements, which constitute the plurality of information elements of the first setting information; and a second output unit that outputs the acquired plurality of second type information elements, wherein the number of the prescribed types is a smaller number than the types of information elements required for constructing the remote copy environment, wherein the second acquisition unit acquires address information of the certain second communication port as the second type information element, and in the first setting, first path information is set based on port identification information of the certain first communication port, and address information of the certain second communication port, wherein the first path information denotes a first path via which data is outputted from the certain first communication port and inputted to the certain second communication port, and wherein the certain first communication port and the certain second communication port are predetermined communication ports.

3. A remote copy system, comprising:
a first storage system;
a second storage system connected to the first storage system; and
a first operator interface for receiving the input of a prescribed type information element from an operator,
wherein the first storage system comprises a plurality of first logical volumes, a plurality of first communication ports, and a first controller,
wherein the second storage system comprises a plurality of second communication ports, and a second controller, and
wherein the first controller comprises:
a first acquisition unit that acquires a plurality of first type information elements, which constitute a plurality of elements of second setting information;
a first output unit that outputs the acquired plurality of first type information elements;
a first input unit that inputs first setting information, comprising a plurality of second type information elements; and
a first setting unit that executes a first setting required to construct a remote copy environment, based on the plurality of second type information elements, which are comprised in the first setting information, and the plurality of first type information elements,
wherein the remote copy environment is an environment, which enables to copy data between a certain first logical volume of the plurality of first logical volumes and a certain second logical volume by way of a certain first communication port of the plurality of first communication ports and a certain second communication port of the plurality of second communication ports,
wherein the second setting information is information, which is inputted to the second storage system, and is used in a second setting required for constructing the remote copy environment,
wherein the first setting information is information, which is inputted to the first storage system, and is used in the first setting, and
wherein the second controller comprises:
a second input unit that inputs the second setting information, which comprises the plurality of first type information elements, and a prescribed type information element inputted to the first operator interface;
a second setting unit that executes the second setting based on the plurality of first type information elements and the prescribed type information element;
a second acquisition unit that acquires the plurality of second type information elements, which constitute the plurality of information elements of the first setting information; and
a second output unit that outputs the acquired plurality of second type information elements,
wherein the number of the prescribed types is a smaller number than the types of information elements required for constructing the remote copy environment,
wherein the first acquisition unit acquires address information of the certain first communication port as the first type information element,
in the second setting, second path information is set based on the address information of the certain first communication port and the port identification information of the certain second communication port, wherein the second path information denotes a second path via which data is outputted from the certain second communication port and inputted to the certain first communication port, and
wherein the certain first communication port and the certain second communication port are predetermined communication ports.

4. The remote copy system according to claim 3, further comprising:
a backup unit that backs up data stored in the certain first logical volume to the certain second logical volume by way of the first path; and
a data restore unit that restores data stored in the certain second logical volume to either the certain first logical volume or a restored first logical volume by way of either the second path or a newly created second path.

5. The remote copy system according to claim 4, further comprising:
a second operator interface for receiving a restore indication from the operator;
a first configuration information read unit that reads configuration information from at least one of the plurality of first physical storage devices;
a configuration information save unit that saves the read configuration information to the second storage system;
a second configuration information read unit that reads out the saved configuration information upon receiving a restore indication via the second operator interface; and
a volume restore unit that writes the read configuration information to at least one of the plurality of first physical storage devices, and, on the basis of the configuration information, restoring the plurality of first logical volumes in a third storage system instead of the first storage system in which a failure has occurred,
wherein the configuration information is information related to how the first logical volume is configured in use of which first physical storage device in the first storage system, at what amount of storage capacity, and in correspondence to what volume identification information, and
wherein the data restore unit restores the data stored in the plurality of second logical volumes to the constructed plurality of first logical volumes by way of the second path.

6. The remote copy system according to claim 5, wherein one second storage system is connected to a plurality of first storage systems, and
wherein the configuration information save unit saves the configuration information to the second storage system for each first storage system.

7. A remote copy system, comprising:
a first storage system;
a second storage system connected to the first storage system; and
a first operator interface for receiving the input of a prescribed type information element from an operator,
wherein the first storage system comprises a plurality of first logical volumes, a plurality of first communication ports, and a first controller,
wherein the second storage system comprises a plurality of second communication ports, and a second controller, and
wherein the first controller comprises:
a first acquisition unit that acquires a plurality of first type information elements, which constitute a plurality of elements of second setting information;

a first output unit that outputs the acquired plurality of first type information elements;

a first input unit that inputs first setting information, comprising a plurality of second type information elements; and a first setting unit that executes a first setting required to construct a remote copy environment, based on the plurality of second type information elements, which are comprised in the first setting information, and the plurality of first type information elements, wherein the remote copy environment is an environment, which enables to copy data between a certain first logical volume of the plurality of first logical volumes and a certain second logical volume by way of a certain first communication port of the plurality of first communication ports and a certain second communication port of the plurality of second communication ports, wherein the second setting information is information, which is inputted to the second storage system, and is used in a second setting required for constructing the remote copy environment, wherein the first setting information is information, which is inputted to the first storage system, and is used in the first setting, and wherein the second controller comprises:

a second input unit that inputs the second setting information, which comprises the plurality of first type information elements, and a prescribed type information element inputted to the first operator interface;

a second setting unit that executes the second setting based on the plurality of first type information elements and the prescribed type information element;

a second acquisition unit that acquires the plurality of second type information elements, which constitute the plurality of information elements of the first setting information; and a second output unit that outputs the acquired plurality of second type information elements, wherein the number of the prescribed types is a smaller number than the types of information elements required for constructing the remote copy environment, wherein the respective first communication ports and the respective second communication ports are iSCSI ports, wherein the prescribed type information element is volume identification information of the certain first logical volume, and system identification information of a partner storage device of the first storage system, wherein the remote copy system further comprises an advisability determination unit that executes an advisability determination as to whether or not the second storage system can be the partner of the first storage system, wherein the first acquisition unit acquires, as the first type information element, a port IP address of the certain first communication port, a storage capacity of the certain first logical volume, and the system identification information of the first storage system, wherein the second acquisition unit acquires, as the second type information element, the volume identification information of a second logical volume, which is the certain second logical volume for configuring a volume pair with the certain first logical volume, and which has storage capacity equal to or greater than that of the certain first logical volume, and the port IP address of the certain second communication port, wherein the advisability determination comprises a determination as to whether or not the system identification information serving as the prescribed type information element comprised in the second setting information conforms to the system identification information stored by the second storage system, and a determination as to whether or not the second storage system has greater storage capacity than the storage capacity of the certain first logical volume, wherein the second setting unit executes the second setting when a result of the advisability determination is affirmative, in the second setting, second path information is set on the basis of the port IP address of the certain first communication port, port identification information of the certain second communication port, and a timeout time and/or line bandwidth information, wherein the second path information denotes a second path via which data is outputted from the certain second communication port and inputted to the certain first communication port, in the first setting, volume pair information comprising the volume identification information of the certain first logical volume and the volume identification information of the certain second logical volume, is set, and, first path information is set on the basis of the port identification information of the certain first communication port, the port IP address of the certain second communication port, and a timeout time and/or line bandwidth information, wherein the first path information denotes a first path via which data is outputted from the certain first communication port and inputted to the certain second communication port, wherein the certain first logical volume is a data copy-source logical volume, wherein the certain second logical volume is a data copy-target logical volume, wherein the certain first communication port and the certain second communication port are predetermined communication ports, and wherein the timeout time and/or line bandwidth information are fixed values.

* * * * *